(12) United States Patent
Pu et al.

(10) Patent No.: US 11,162,016 B2
(45) Date of Patent: Nov. 2, 2021

(54) RE-ASSEMBLING POLYMER PARTICLE PACKAGE FOR CONFORMANCE CONTROL AND FLUID LOSS CONTROL

(71) Applicant: The Curators of the University of Missouri, Columbia, MO (US)

(72) Inventors: Jingyang Pu, Rolla, MO (US); Baojun Bai, Rolla, MO (US); Thomas Schuman, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 232 days.

(21) Appl. No.: 16/306,148

(22) PCT Filed: Jun. 1, 2017

(86) PCT No.: PCT/US2017/035542
§ 371 (c)(1),
(2) Date: Nov. 30, 2018

(87) PCT Pub. No.: WO2017/210486
PCT Pub. Date: Dec. 7, 2017

(65) Prior Publication Data
US 2020/0325384 A1 Oct. 15, 2020

Related U.S. Application Data

(60) Provisional application No. 62/344,732, filed on Jun. 2, 2016.

(51) Int. Cl.
*C09K 8/516* (2006.01)
*C09K 8/504* (2006.01)
*C09K 8/512* (2006.01)

(52) U.S. Cl.
CPC ............ *C09K 8/516* (2013.01); *C09K 8/5045* (2013.01); *C09K 8/512* (2013.01); *C09K 2208/10* (2013.01)

(58) Field of Classification Search
None
See application file for complete search history.

(56) References Cited

U.S. PATENT DOCUMENTS 3,306,870 A    2/1967   Eilers et al.
5,399,269 A    3/1995   Moradi-Araghi
(Continued)

FOREIGN PATENT DOCUMENTS

CN    105504158    4/2016
EP    1 538 301    6/2005
(Continued)

OTHER PUBLICATIONS

Sydansk et al., "Gel conformance treatments increase oil production in Wyoming," Oil and Gas Journal, Jan. 20, 1992, vol. 90:3, 3 pages. (abstract only attached).

(Continued)

*Primary Examiner* — John J Figueroa
(74) *Attorney, Agent, or Firm* — Hovey Williams LLP

(57) ABSTRACT

This invention is broadly concerned with compositions and processes for oilfield applications. More specifically, this invention relates to novel polymer constructed packages that, when pumped into a petroleum well, provide tunable characteristics of transformation and delayed self-assembly with each other under reservoir conditions to yield strong, elastic, bulk gel materials. The compositions comprise a polymer, assembling agents, and optional additives used for the re-assembly stage are uniformly-distributed within the initial gel particles. The polymer particle packages absorb water and swell upon exposure to water, thus exposing the "assembling agents" that enable re-assembly. Both swelling and re-assembly are proportionally controlled via composi- (Continued)

tions to be tunable to allow functional dispersion and subsequent self-assembly under various reservoir conditions.

17 Claims, 18 Drawing Sheets

(56) References Cited

U.S. PATENT DOCUMENTS

| | | | |
|---|---|---|---|
| 5,423,380 | A | 6/1995 | Johnston et al. |
| 5,465,792 | A | 11/1995 | Dawson et al. |
| 5,480,933 | A | 1/1996 | Fox et al. |
| 5,735,349 | A | 4/1998 | Dawson et al. |
| 6,165,947 | A | 12/2000 | Chang et al. |
| 6,454,003 | B1 | 9/2002 | Chang et al. |
| 7,300,973 | B2 | 11/2007 | Chang et al. |
| 2010/0314114 | A1* | 12/2010 | Moradi-Araghi ........ C09K 8/12 166/305.1 |
| 2011/0036583 | A1* | 2/2011 | Willberg ................. E21B 43/26 166/308.1 |
| 2011/0094746 | A1* | 4/2011 | Allison ................... C09K 8/424 166/308.5 |
| 2012/0037364 | A1 | 2/2012 | Guan et al. |
| 2014/0090850 | A1* | 4/2014 | Benicewicz ............ E21B 43/26 166/308.2 |
| 2014/0102707 | A1 | 4/2014 | Moradi-Araghi et al. |
| 2016/0032170 | A1 | 2/2016 | Li et al. |
| 2017/0166797 | A1* | 6/2017 | Reddy ................... E21B 33/138 |
| 2018/0230372 | A1 | 8/2018 | Liang et al. |
| 2019/0119559 | A1 | 4/2019 | O'Toole et al. |

FOREIGN PATENT DOCUMENTS

| | | |
|---|---|---|
| RU | 2 496 977 | 10/2013 |
| WO | 98/06929 | 2/1998 |
| WO | 2010/144588 | 12/2010 |
| WO | 2013/006275 | 1/2013 |
| WO | 2013/112664 | 8/2013 |

OTHER PUBLICATIONS

Chauveteau et al., "Controlling Gelation Time and Microgel Size for Water Shutoff," SPE 59317, Society of Petroleum Engineers Inc., Prepared for Presentation at the 2000 SPE/DOE Improved Oil Recovery Symposium held in Tulsa, Oklahoma, Apr. 3-5, 2000, 8 pages.
Rousseau et al., "Rheology and Transport in Porous Media of New Water Shutoff/Conformance Control Microgels," SPE 93254, Society of Petroleum Engineers Inc., Prepared for Presentation at the 2005 SPE International Symposium on Oilfield Chemistry held in Houston, Texas, Feb. 2-4, 2005, 12 pages.
Zaitoun et al., "Using Microgels to Shut Off Water in a Gas Storage Well," SPE 106042, Society of Petroleum Engineers, Prepared for Presentation at the 2007 SPE International Symposium on Oilfield Chemistry held in Houston, Texas, Feb. 28-Mar. 2, 2007, 8 pages.
Al-Anazi et al., "Use of a pH Sensitive Polymer for Conformance Control," SPE 73782, Society of Petroleum Engineers Inc., Prepared for Presentation at the SPE International Symposium and Exhibition on Formation Damage Control held in Lafayette, Louisiana, Feb. 20-21, 2002, 8 pages.
Benson et al., "Development and Use of a Simulation Model for Mobility/Conformance Control Using a pH-Sensitive Polymer," SPE 109665, Society of Petroleum Engineers, Prepared for Presentation at the 2007 SPE Annual Technical conference and Exhibition held in Anaheim, California, Nov. 11-14, 2007, 10 pages.
Pritchett et al., "Field Application of a New In-Depth Waterflood Conformance Improvement Tool," SPE 84897, Society of Petroleum Engineers Inc., Prepared for Presentation at the SPE International Improved Oil Recovery Conference in Asia Pacific held in Lumpur, Malaysia, Oct. 20-21, 2003, 8 pages.
Frampton et al., "Development of a novel waterflood conformance control system," SPE 89391, Society of Petroleum Engineers Inc., Prepared for Presentation at the 2004 SPE/DOE Fourteenth Symposium on Improved Oil Recovery held in Tulsa, Oklahoma, Apr. 17-21, 2004, 9 pages.
Bai et al., "Field and Lab Experience with a Successful Preformed Particle Gel Conformance Control Technology," SPE 164511, Society of Petroleum Engineers, Prepared for Presentation at the SPE Production and Operations Symposium held in Oklahoma City, Oklahoma, Mar. 23-26, 2013, 17 pages.
Zhang et al., "Preformed-Particle-Gel Transport Through Open Fractures and Its Effect on Water Flow," SPE 129908, Society of Petroleum Engineers, SPE Journal, Jun. 2011, pp. 388-400.
Imqam et al., "Preformed Particle Gel Extrusion through Open Conduits during Conformance Control Treatments," SPE-169107-MS, Society of Petroleum Engineers, Prepared for Presentation at the SPE Improved Oil Recovery Symposium held in Tulsa, Oklahoma, Apr. 12-16, 2014, 15 pages.
Almohsin et al., SPE-169078-MS, "Transport of Nanogel through Porous Media and Its Resistance to Water Flow," Society of Petroleum Engineers, Prepared for Presentation at the SPE Improved Oil Recovery Symposium held in Tulsa, Oklahoma, Apr. 12-16, 2014, 14 pages.
Office Action dated Oct. 2, 2020 in corresponding Russian Patent Application No. 2018141482, 4 pages.
Search Report dated Sep. 30, 2020 in corresponding Russian Patent Application No. 2018141482, 2 pages.
Office Action Summary (and English translation) dated Sep. 28, 2020 in corresponding Chinese Patent Application No. 201780033570. 2, 4 pages.
Machine Translation of CN105504158, 14 pages.
Machine Translation of Office Action in corresponding Russian Patent Application No. 2018141482, 6 pages.
Machine Translation of Search Report in corresponding Russian Patent Application No. 2018141482, 4 pages.
Text of the Office Action dated Sep. 28, 2020 in corresponding Chinese Patent Application No. 201780033570.2, 7 pages (no English version available).
International Search Report and Written Opinion dated Aug. 11, 2017 in corresponding PCT/US2017/035542 filed Jun. 1, 2017, 12 pages.
International Preliminary Report on Patentability dated Dec. 13, 2018 in corresponding PCT/US2017/035542 filed Jun. 1, 2017, 8 pages.
Coste et al., "In-Depth Fluid Diversion by Pre-Gelled Particles. Laboratory Study and Pilot Testing," 2000 SPE/DOE Improved Oil Recovery Symposium held in Tulsa, Oklahoma, Apr. 3-5, 2000, 8 pages.
Office Action dated Oct. 7, 2019 in corresponding Chilean Patent Application No. 3397-2018, 14 pages.
EP1538301 Machine Translation, 15 pages.
Office Action dated Jul. 2, 2021 in corresponding Colombian patent application NC2018/0013583, 9 pages.
Partial Translation of Office Action dated Jul. 2, 2021 in corresponding Colombian patent application NC2018/0013583, 6 pages.

* cited by examiner

Dry RPP → Swollen RPP → Re-assembled RPP

Dry RPP             Swollen RPP            Re-assembled RPP

RE-ASSEMBLING POLYMER PARTICLE PACKAGE FOR CONFORMANCE CONTROL AND FLUID LOSS CONTROL

RELATED APPLICATIONS

This application claims priority to PCT international Patent Application No. PCT/US2017/035,542, filed Jun. 1, 2017 which claims the priority benefit of U.S. provisional Patent Application No. 62/344,732, filed Jun. 2, 2016, both of which are hereby incorporated by reference in their entireties.

BACKGROUND OF THE INVENTION

Field of the Invention

This invention is broadly concerned with compositions and processes for oilfield applications, and particularly for use in minimizing or avoiding the problems associated with water production in those oilfields.

DESCRIPTION OF THE PRIOR ART

Water production is a major problem for most mature oilfields in the world. Water that is used to push oil resources from an underground oil field is often produced along with oil. The water sweep efficiency is limited by the so-called "thief zones," whereby water preferentially travels through the more porous regions of the reservoirs, bypassing less porous zones. The reduced resistance to water flow through the larger, swept pores results in preferential flow and excess water production instead of oil production. Excess water production results in increased levels of corrosion and scale, an increased load on fluid-handling facilities, and increased environmental concerns, all of which can eventually shut down the well. Controlling water production has been a major objective of the oil industry. Reservoir pore size heterogeneity, including 'large pore' defects such as cracking, eroded channels, and/or voids, is the most important reason for low recovery and early excess water production.

There is a need for new methods and systems for decreasing water production.

SUMMARY OF THE INVENTION

In one embodiment, the present invention is concerned with a composition useful for controlling fluid flow. The composition comprises a plurality of swellable particles. The swellable particles comprise an assembling agent interspersed among crosslinkable polymer chains, and the assembling agent is one that will associate with the polymer chains upon exposure to a fluid capable of swelling the polymer chains. The assembling agent is selected from the group consisting of polyacrylamide, one of the multivalent Group III-VII transition metal molecules, methylene bisacrylamide, polyethylene glycol, dimethacrylate, phenol-formaldehyde, diallylamine, triallylamine, divinyl sulfonate, diethylene glycol, polyethyleneimine, dichlorophenol, benzoyl peroxide, di-tert-butyl peroxide, dibutyl hydrogen phosphite, $C_8$-$C_{22}$ alkanes, and mixtures thereof.

In another embodiment, the invention provides a method of forming a composition useful for controlling fluid flow. The method comprises polymerizing a plurality of monomers in the presence of a source of an assembling agent so as to form crosslinkable polymer chains. The resulting product is dried and the average particle size reduced to yield a plurality of swellable particles comprising the assembling agent interspersed among the crosslinkable polymer chains. The assembling agent is one that will associate with the polymer chains upon exposure to a fluid and is selected from the group consisting of monomers, oligomers, polymers, copolymers, Group III-VII transition metal containing molecules, Group III-VII transition metal ions, methylene bisacrylamide, polyethylene glycol, dimethacrylate, phenol-formaldehyde, diallylamine, triallylamine, divinyl sulfonate, diethylene glycol, aldehydes, polyethyleneimine, dichlorophenol, benzoyl peroxide, di-tert-butyl peroxide, dibutyl hydrogen phosphite, $C_8$-$C_{22}$ alkanes, and mixtures thereof.

In a further embodiment, the invention provides a method of altering or controlling a fluid present in an environment comprising introducing a composition into the environment so that the composition contacts the fluid. The composition comprises a plurality of swellable particles comprising an assembling agent interspersed among crosslinkable polymer chains. The assembling agent is one that will associate with the polymer chains upon exposure to the fluid and is selected from the group consisting of monomers, oligomers, polymers, copolymers, Group III-VII transition metal containing molecules, Group III-VII transition metal ions, methylene bisacrylamide, polyethylene glycol, dimethacrylate, phenol-formaldehyde, diallylamine, triallylamine, divinyl sulfonate, diethylene glycol, aldehydes, polyethyleneimine, dichlorophenol, benzoyl peroxide, di-tert-butyl peroxide, dibutyl hydrogen phosphite, $C_8$-$C_{22}$ alkanes, and mixtures thereof.

BRIEF DESCRIPTION OF THE FIGURES

FIG. 23 is a graph depicting the relationship of brine water injection pressures to brine water flow rate after gels were broken through.

DETAILED DESCRIPTION OF THE PREFERRED EMBODIMENTS

Figure 1:
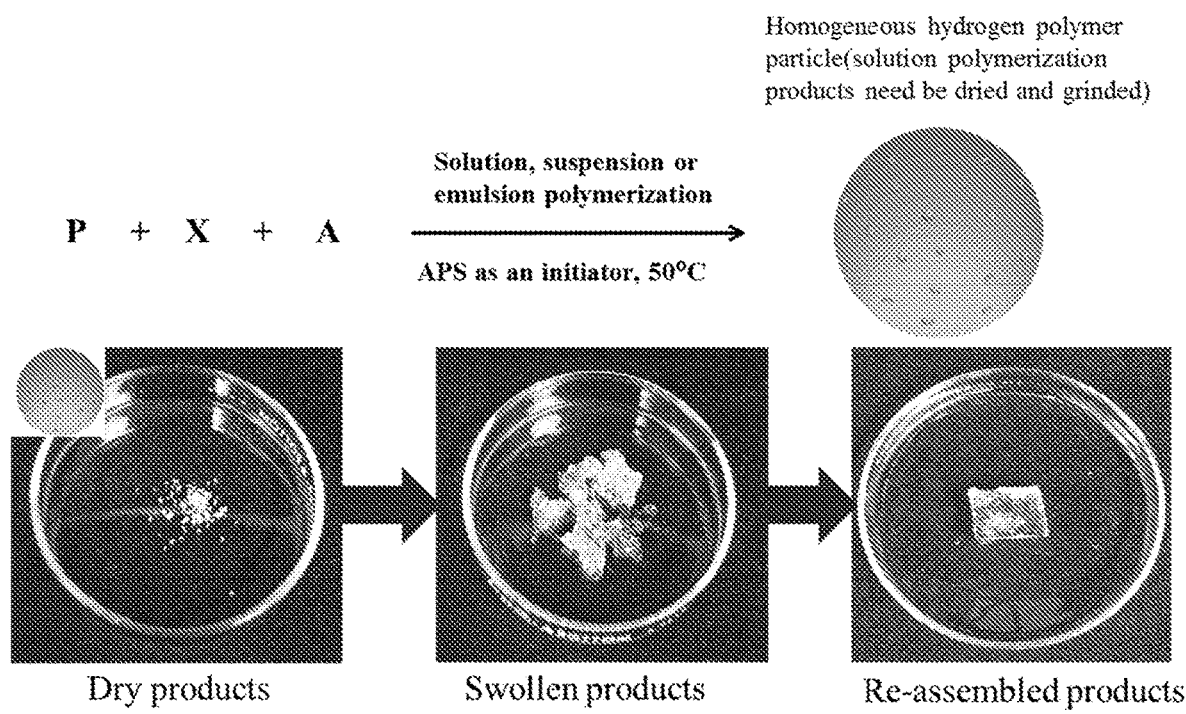
FIG. 1 is a set of photographs showing the synthesis procedure and re-assembling procedure of re-assembled polymer packages described in Example 1.

To overcome the major drawbacks of the prior art, the present invention broadly provides a novel particle system, which is referred to as a re-assembled particle package or "RPPG," and methods of using that system. The system is a type of "package" that is synthesized using multiple components, including monomers to be polymerized, an assembling agent, and optional other ingredients.

The starting monomers are preferably selected from the group consisting of acrylamides, sugars/saccharides, chloroprene, nitrile-containing compounds, sulfonates, acrylates, methacrylate, silicates, nano-clays and combinations of the foregoing. The monomers can be selected to create a homopolymer(s), a copolymer(s), and both a homopolymer(s) and a copolymer(s). Polymerizing can be carried out using conventional polymerization techniques, including those selected from the group consisting of solution polymerization, emulsion polymerization (including inverse emulsion polymerization), and suspension polymerization.

It will be appreciated that this polymerization allows one to custom synthesize the polymer (including making desired chemical modifications). In an alternative embodiment, the polymer can be a commercial product or "off-the-shelf" polymer as well, with the assembling agent being incorporated into the polymer chain network.

The assembling agent is selected to be one that associates with the final polymer in situ, thus producing a gel. Additionally, the type of assembling agent can be used to control the re-assembly time. It is preferred that the assembling agent does not react with the above monomers during the manufacture of the package. Preferably, assembling agents have positively and/or negatively charged groups and can be either single component or multiple components. The most preferred assembling agents are selected from the group consisting of polyacrylamide, one of the multivalent Group III-VII transition metal molecules, methylene bisacrylamide, polyethylene glycol, dimethacrylate, phenol-formaldehyde, diallylamine, triallylamine, divinyl sulfonate, diethylene glycol diallyl aldehydes, diethyeneglycol diallyl ether, polyethyleneimine, dichlorophenol, benzoyl peroxide, di-tert-butyl peroxide, dibutyl hydrogen phosphite (DBHP), $C_8$-$C_{22}$ alkanes, and mixtures thereof. Particularly preferred assembling agents are selected from the group consisting of Cr, Zr, Co, and Al molecules or ions, organic compounds such as those selected from the group consisting of methylene bisacrylamide, polyethylene glycol, dimethacrylate, phenol-formaldehyde, diallylamine, triallylamine, divinyl sulfonate, diethylene glycol diallyl aldehydes, diethylene glycol diallyl ether, polyethyleneimine, and combinations of the foregoing.

The foregoing agents can be provided directly, or a source of that particular assembling agent can be provided. Examples of preferred sources of assembling agents include those selected from the group consisting of zirconium-acetate, chromium-acetate, aluminum acetate, aluminum citrate, cobalt acetate, zirconyl chloride, and mixtures of the foregoing.

The concentration of each type of assembling agent utilized is used to control the gelation properties in the final package. That is, the assembling agent concentration can be used to control the re-assembled gel strength (for robust gels) or viscosities (for weak gels). This typically results in a preferred weight ratio of monomers to assembling agent is from about 2:1 to about 200:1, more preferably from about 5:1 to about 50:1, and even more preferably from about 5:1 to about 15:1. Such a ratio will typically result in monomers present at levels of from about 15 to about 50% by weight, preferably from about 23 to about 50% by weight, and more preferably from about 23 to about 30% by weight, based upon the weight of total solids utilized taken as 100% by weight. Furthermore, this will typically result in the total assembling agent being present at levels of from about 0.5 to about 6% by weight, preferably from about 1.25 to about 6% by weight, and more preferably from about 3.5 to about 6% by weight, based upon the weight of all ingredients utilized taken as 100% by weight.

A polymerization initiator will also be present during the synthesis process. The initiator will be selected based on the monomers being utilized and the polymerization process selected, but typical initiators include those selected from the group consisting of persulfates (e.g., ammonium persulfate, potassium persulfate), N,N,N',N'-tetramethylethylenediamine, acyl peroxide, hydrogen peroxide, dialkyl peroxides, ester peroxide, ketone peroxide, azo compounds, and mixtures of thereof. Furthermore, the amount of initiator utilized will typically be from about 0.01 to about 0.2% by weight, preferably from about 0.02 to about 0.1% by weight, and more preferably from about 0.02 to about 0.05% by weight, based upon the weight of the monomers utilized taken as 100% by weight.

A polymerization accelerator can optionally be present during the synthesis process. Typical accelerators include those selected from the group consisting of sodium thiosulfate (STS), sodium bisulfite (SBS), sodium metabisulfite (SMS), thiomalic acid, nitrilotriacetic acid, glycerol, ascorbic acid, and mixtures thereof. Furthermore, the amount of accelerator utilized will typically be from about 0.01 to about 0.2% by weight, preferably from about 0.02 to about 0.1% by weight, and more preferably from about 0.02 to about 0.05% by weight, based upon the weight of all ingredients utilized taken as 100% by weight.

Additives can be mixed into the system before the synthesis stage, preferably those additives are ones that coordinate/associate with the formed polymer (e.g., to form hydrogen bond/Van der Waals associations). Other additives can interpenetrate the polymer chains, while others can simply be mixed into the system without reaction with other components. For instance, the nanometer or micrometer size particles can be pre-treated by surfactant or a surface coating material before mixing into reservoir fluid.

Exemplary optional ingredients or additives include those selected from the group consisting of tackifiers, plasticizers, crosslinking agents, polymers other than the crosslinkable polymer, aromatic compounds, polysaccharides, deoxidants, adjustors of gelant (e.g., $NH_4Cl$, NaOH, carbamide), clays (e.g., montmorillonite, bentonite), nanoclay, initiators, stabilizers (e.g., tetramethylethylenediamine, resorcinol, organic complexing agents, $NaN_3$), celluloses, epoxy resins, silica, silicon oxide, aluminum oxide, carbon nanotubes, graphene, micro-fiber or nylon particles, ethylenediaminetetraacetic acid (EDTA), and mixtures thereof.

The inventive package itself is prepared by polymerizing the above monomers in the presence of the assembling agent and any optional ingredients. The polymerization will take place in a solvent system, and most preferably it will be an aqueous solvent system. In addition to and/or other than water, other solvents that can be utilized (e.g., saline solutions), depending upon the situation. Regardless, the solvent system will typically be present at levels of from about 50 to about 70% by weight, preferably from about 65 to about 70% by weight, and more preferably from about 66.7 to about 70% by weight, based upon the total weight of all ingredients utilized taken as 100% by weight. Of course, the solids levels would be the balance of the foregoing percentages.

During the polymerization process, the foregoing monomers polymerize to form a plurality of crosslinkable polymer chains. The resulting polymers can be one or more homopolymer, one or more copolymer, or a mix of homopolymers and copolymers, depending upon the user's final goal.

Typical polymers for use in the invention include those selected from the group consisting of polymers or copolymers of hydrolyzed polyacrylamide, polyacrylamide, chloroprene rubber, nitrile rubber, hydrophilic resin sulfonate, xanthan, guar, acrylates or methacrylates (e.g., lauryl methacrylate, stearyl methacrylate) silicates, acrylamides (e.g., N, N-dimethylacrylamide), and combinations of the foregoing.

During polymerization, the assembling agents release free radicals after being dissolved in the solvent, thus causing them to associate with the polymer chains as they are formed, forming a crosslinked gel. The assembling agent and any other ingredients end up being substantially uniformly distributed within the entangled (but not crosslinked) polymer chain network. Thus, all the compositions will be proportionally released at the same time in the reservoir conditions (e.g., reservoir temperature, formation liquid pH or salinity, formation electrical property), and the reassembled gel quality can be better controlled.

The resulting particles could be in four forms: turbid liquid, emulsions, wet particles, and dry particle gel system. The package can be synthesized either as a bulk gel and then be dried and ground into micro- or millimeter-sized particles, or as a micro-particle, submicro-particles, or nanoparticles through emulsion polymerization. For solid particles, the particle size could be ranged from nanometer to millimeter. Typically, the average particle size (using the largest average dimension) of the particles is from about 80 nm to about 10 mm, preferably from about 800 nm to about 10 mm, more preferably from about 800 nm to about 4 mm, and even more preferably from about 800 nm to about 2 mm. The preferred weight ratio of polymers to assembling agent is from about 2:1 to about 200:1, more preferably from about 5:1 to about 50:1, and even more preferably from about 5:1 to about 15:1.

In use, the polymer particle packages can be dispersed by water and pumped into formation. During their transport through formation, all of the components in the package will move together, and thus the segregation and chromatographic problems of prior art systems are avoided. After placement in the reservoirs, the particles accumulate in large fractures, channels, and/or other highly-permeable features will proportionally release all compositions from the particles under reservoir conditions after a designed time, which can avoid the problems of composition variation and/or non-uniform distribution found in the prior art.

Upon exposure to water, brine (e.g., aqueous NaCl, $CaCl_2$, or $AlCl_3$), or other fluids, the polymer particle packages begin to swell. It is preferred that swelling commence within about 0.1 seconds to about 300 seconds, and preferably within about 0.1 seconds to about 10 seconds of contact with the target fluid. The particles will swell to a size that is at least about 20 times, preferably at least about 40 times, and more preferably at least about 100 times their initial average particles sizes. In some embodiments, the particles will swell to a size that is from about 10 times to about 200 times, preferably from about 20 times to about 200 times, and more preferably from about 30 times to about 100 times their initial average particles sizes. It is preferred that these swelling ranges be reached within a time period of from about 60 minutes to about 240 hours, preferably from about 60 minutes to about 300 minutes, and preferably from about 120 minutes to about 180 minutes of contact with the target fluid.

As the particles swell, the polymer chain network is relaxed from its entangled state. This relaxing exposes the assembling agent, which enables interaction. The package can be suitable to reassociate at any temperatures above 20° C. During this swelling, the particles associate, combine together, and form a bulk gel. That is, the released compositions will stick all particles together to form a thermostable strong gel. "Thermos-stable" means that the assembled gels are physically and chemically stable and will be minimally or not at all degraded by reservoir environments. "Reservoir conditions" refers to conditions related to a true petroleum ground source reservoir, including reservoir temperature, formation liquid pH or salinity, and formation electrical property. These conditions can influence the re-assembling particle package's re-assembling time by affecting the assembling agent release rate. Therefore, particular designs of re-assembling particle package are given to different reservoir conditions to meet all needs of requests (strength and swelling re-assembling time).

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth preferred embodiments in accordance with the invention. It is to be understood, however, that these examples are provided by way of illustration, and nothing therein should be taken as a limitation upon the overall scope of the invention.

The following abbreviations are used herein:
AM ACRYLAMIDE
AA ACRYLIC ACID
AMPS 2-ACRYLAMIDO-2-METHYLPROPANE SULFONATE
APS AMMONIUM PERSULFATE
BDHP DIBUTYL HYDROGEN PHOSPHITE
DLS DYNAMIC LIGHT SCATTERING
EDTA ETHYLENEDIAMINETETRAACETIC ACID
HETA (1-HEXADECYL) TRIMETHYL-AMMONIUM BROMIDE
MC METHYL CELLULOSE
PEI POLYETHYLENEIMINE
PSH POLYOXYETHYLENE SORBITOL HEXAOLEATE
RPPG RE-ASSEMBLING POLYMER PARTICLE PACKAGE
SBS SODIUM BISULFITE
SMS SODIUM METABISULFITE Example 1

Acrylamide/Zirconium(III, IV) Initiated by Ammonium Persulfate

A representative zirconium(III, IV)-acetate sealed in a polyacrylamide package, herein referred to as "Z2-10 (0.08% Zr(III, IV)) to Z2-14 (0.8% Zr(III, IV))" was prepared using a solution polymerization process.

In one such process, an aqueous mixture containing 30 g acrylamide, 100 g deionized water, and 3.5 g zirconium(III, IV) (Z2-13) acetate hydroxide was prepared in a vessel that was agitated until the reactants had dissolved completely. Initiator ammonium persulfate (200 ppm) was weighed and dissolved in another glass vessel. The solution was deoxygenized by nitrogen purging.

The polymerization was prepared by mixing the aqueous solution and the initiator, followed by rapid homogenization with stirring. Polymerization was carried out in 50° C. for 6 hours, after which the product was dried and grinded. Ammonium persulfate is a low-temperature polymerization initiator, whose rate of decomposition is first-order and is unaffected by contaminants such as metal ions. Zirconium (III, IV) acetate is an agent that will not participate in polymerization process.

Figure 2:
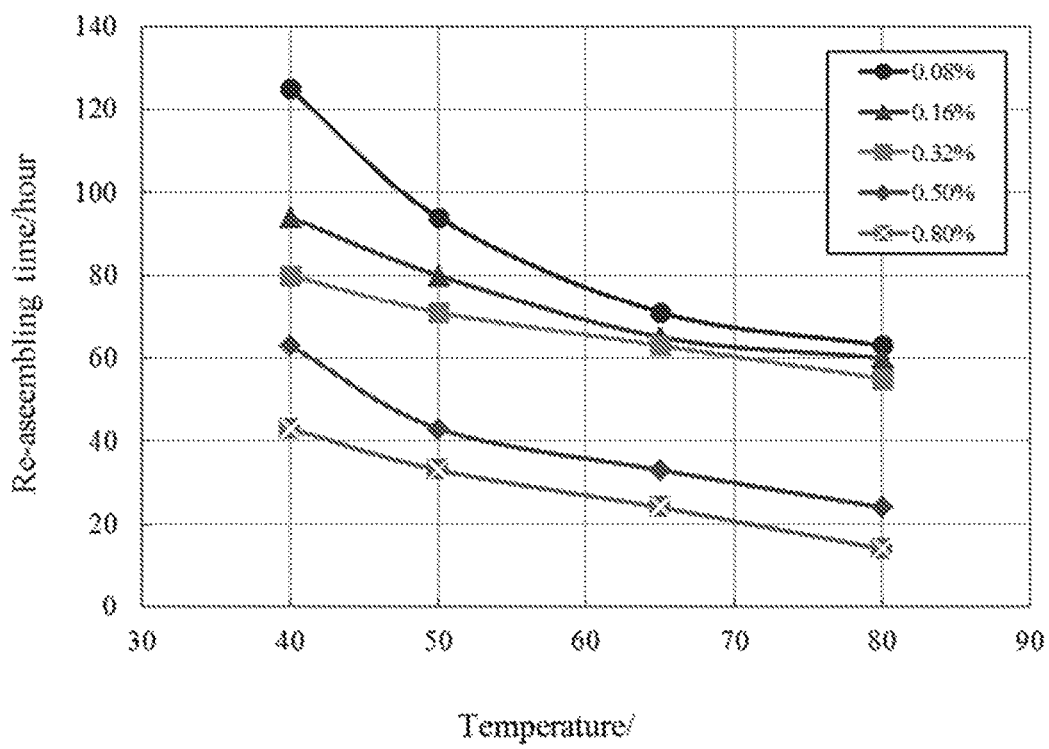
FIG. 2 is a graph comparing the re-assembling times of Z2-10 (0.08% Zr(III)), Z2-11 (0.16% Zr(III, IV)), Z2-12 (0.32% Zr(III, IV)), Z2-13 (0.5% Zr(III, IV)) and Z2-14 (0.8% Zr(III, IV)) of Example 1 with various temperatures in 1% NaCl brine.

The samples were tested to determine their re-assembling time at different temperatures with varying re-assembling agent concentrations in 1% NaCl brine by bottle test method (i.e., gel and the designed aqueous environment are placed in a transparent bottle, which is placed into an oven and monitored/recorded). The re-assembling time was determined with particles started to bond with each other These results are shown in FIG. 2.

Example 2

Acrylamide/Zirconium(III, IV) Containing Methyl Cellulose ("MC")

A representative zirconium(III, IV)-acetate sealed in a polyacrylamide package, herein referred to as "Z2-10-MC1 to Z2-O-MC4" was prepared containing 6,500 ppm Zr(III, IV) using a solution polymerization process. Specifically, an aqueous mixture containing 30 g acrylamide, 100 g deionized water, and 5.7 g zirconium(III, IV) acetate hydroxide was prepared in one vessel as a monomer mixture, and methyl cellulose mixtures of 0.3 g, 0.5 g, 1 g, or 1.5 g methyl cellulose was prepared in another vessel. The vessels were separately agitated until the reactants had dissolved completely. The initiator (ammonium persulfate, 200 ppm) was weighed and dissolved in another glass vessel. The solution was deoxygenized by nitrogen purging.

The polymerization was prepared by mixing the monomer mixture and the methyl cellulose mixture, following by rapid homogenization with stirring before adding the initiator. Polymerization was carried out in 50° C. for 6 hours, after which the product was dried and grinded. As noted previously, ammonium persulfate is a low-temperature polymerization initiator, whose rate of decomposition is first-order and is unaffected by contaminants such as metal ions. Zirconium(III, IV) acetate is a re-assembling agent that will not participate in polymerization process and will not affected by methyl cellulose at 50° C.

Figure 3:
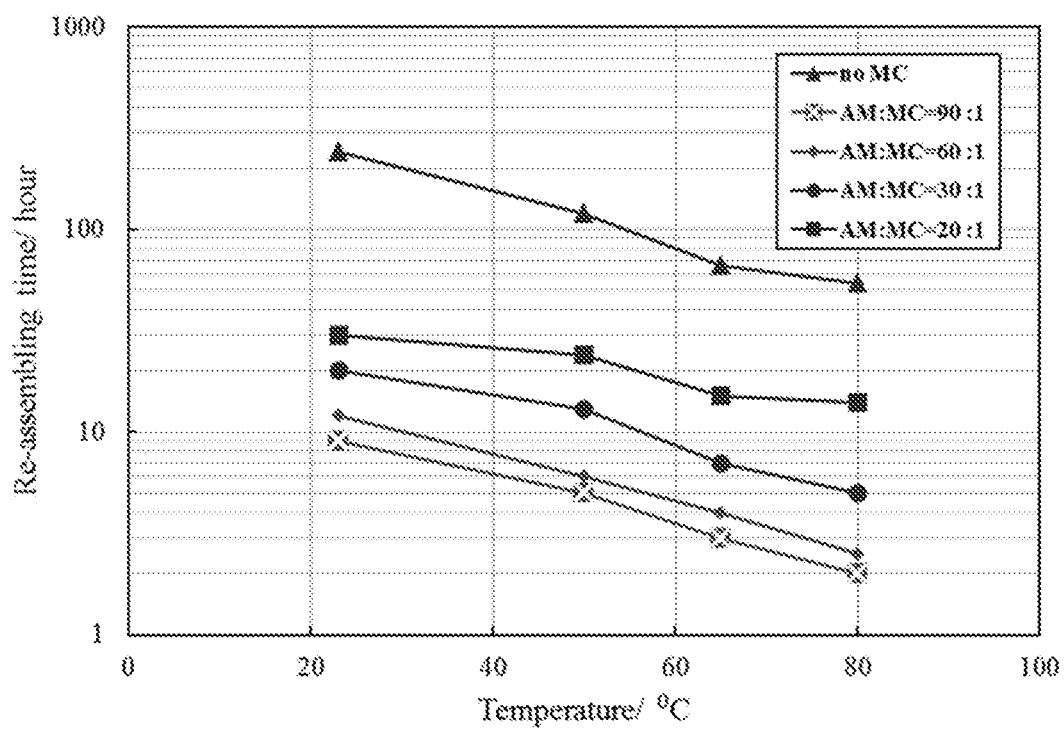
FIG. 3 is a graph comparing the re-assembling times of Z2-10 (0.08% Zr(III, IV)), Z2-10-MC1 (AM: MC=90:1), Z2-10-MC2 (AM: MC=60:1), Z2-10-MC3 (AM: MC=30:1), Z2-10-MC4 (AM: MC=20:1) of Example 2 with various temperatures in 1% NaCl brine.

The samples were tested to determine their re-assembling time at different temperatures with varying methyl cellulose concentrations in 1% NaCl brine under room temperature (23° C.) by bottle test method (methyl cellulose concentration is given as acrylamide/methyl cellulose while acrylamide concentration is constant) (FIG. 3). The re-assembling time was determined with particles started to bond with each other.

Example 3

Acrylamide/Chromium(III) Initiated by Ammonium Persulfate

In this example, zirconium(III, IV)-acetate was replaced with chromium(III)-acetate as the "re-assembling agent," following the synthesis of Example 1 above.

A representative chromium(III)-acetate sealed in a polyacrylamide package, herein referred to as "P78" was prepared containing 4,000 ppm Cr(III) using solution polymerization. In this process, an aqueous mixture containing 30 g acrylamide, 100 g deionized water, and 0.85 g chromium (III) acetate hydroxide was prepared in a vessel that was agitated until the reactants had dissolved completely. An initiator (ammonium persulfate, 200 ppm) was weighed and dissolved in another glass vessel. The solution was deoxygenized by nitrogen purging.

The polymerization was prepared by mixing the aqueous solution and the initiator, followed by rapid homogenization with stirring. Polymerization was carried out in 50° C. for 6.5 hours, after which the product was dried and grinded. As was the case with zirconium(III, IV) acetate, chromium(II) acetate is a re-assembling agent that will not participate in the polymerization process.

Figure 4:
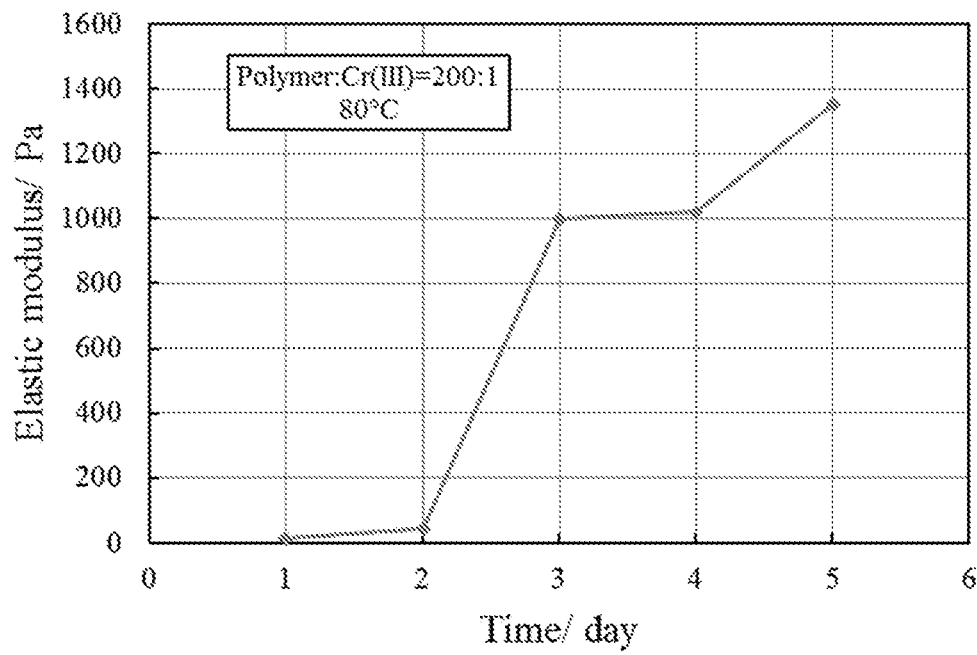
FIG. 4 is a graph depicting P-78 sample (Example 3) re-assembling process with time at 80° C. in 1% NaCl brine.

The elastic modulus was measured during re-assembling in order to monitor the re-assembling starting time. Sample P78 was tested at 80° C. and the result showed that obvious elastic modulus increased after 2 days (FIG. 4).

Example 4

Acrylamide/Chromium(III) Containing Na$^+$ Clay Nano-Composite

A representative chromium(III)-acetate sealed in polyacrylamide package, herein referred to as "P81-C1 to P81-C5" was prepared containing 6,000 ppm Cr(III) using a solution polymerization process. In such process, an aqueous mixture containing 30 g acrylamide, 100 g deionized water, and 1.25 g chromium(III) acetate hydroxide was prepared in a vessel as a monomer mixture. Additionally, a clay mixture of 0.1 g (1-hexadecyl) trimethyl-ammonium bromide and 2.5 g Laponite XLG clay (Na$^+$ nano-clay obtained from WYO-BEN) was prepared. The monomer and clay mixtures were separately agitated until the reactants had dissolved completely. Initiator ammonium persulfate (100 ppm, 200 ppm, 500 ppm, 1000 ppm or 1500 ppm) was weighed and dissolved in another glass vessel. The solution was deoxygenized by nitrogen purging.

Polymerization was carried out by mixing the monomer mixture and the clay mixture, following by rapid homogenization with stirring before add the initiator. This polymerization was carried out in 50° C. for 10 hours, after which the product was dried and grinded. Again, chromium(III) acetate is a re-assembling agent that will not participate in polymerization nor will it be affected by Na$^+$ nano-clay.

Figure 5:
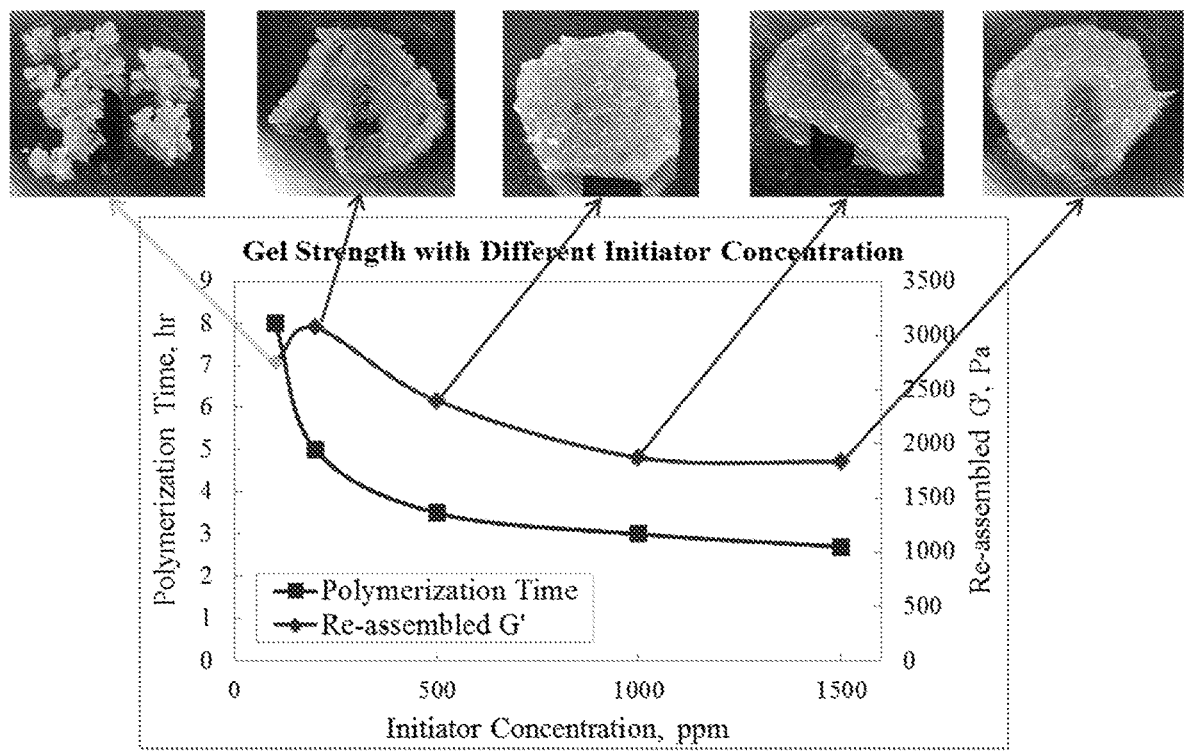
FIG. 5 is a graph comparing polymerization and re-assembling times of P81-C1 (100 ppm APS), P81-C2 (200 ppm APS), P81-C3 (500 ppm APS), P81-C4 (1000 ppm APS) and P81-C5 (1500 ppm APS) of Example 4 in 1% NaCl brine after 48 hours.

Elastic modulus (G') measurement during re-assembling was employed to monitor re-assembling starting time. Samples P81-C1 to P81-C5 were tested under 80° C. and the result showed in FIG. 5.

Example 5

Acrylamide/Zirconium(III, IV) Synthesized Using Suspension Polymerization

A representative zirconium(III, IV)-acetate sealed in polyacrylamide package, herein referred to as "J2" was prepared using a suspension polymerization process. In this process, an aqueous mixture containing 20 g acrylamide, 20 g deionized water, and 0.45 g zirconium(III, IV)-acetate hydroxide was prepared in one vessel as a droplet phase, and one oil mixture of 60 g n-Decane and 2 g Span 80 (a nonionic surfactant) were prepared as a continuous phase. The aqueous mixture and oil mixture were individually agitated until the reactants had dissolved completely. The ammonium persulfate initiator (200 ppm) was weighed and dissolved in another glass vessel. The solution was deoxygenized by nitrogen purging.

The polymerization was prepared by mixing the aqueous mixture and the oil mixture in a flask, following by rapid homogenization with stirring. After adding 20 mg ammonium persulfate as an initiator, the polymerization was carried out in 50° C. for 2.5 hours. The stirring rate was controlled at 400 RPM.

Figure 6:
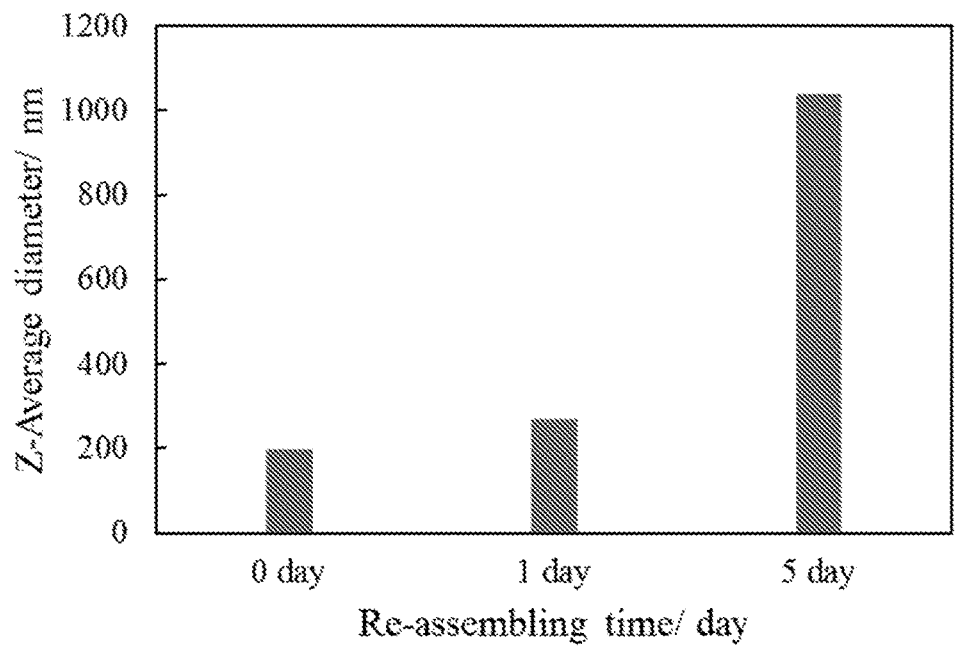
FIG. 6 depicts a J2 sample (Example 5) re-assembling process by comparing size changes over time at 80° C. in 1% NaCl brine.

Next, 0.2% J2 (initial equilibrium swelled size is 200 nm) solution was employed for measuring the re-assembling kinetics over time by dynamic light scattering ("DLS," FIG. 6). The results showed that the Zeta potential diameter increased over time, and >1000 nm aggregated particles were detected after 5 days.

Example 6

Synthesis of Other Compounds

The above example can be repeated using other positively charged monomers, oligomers, and/or polymers, such as acrylic acid, 2-acrylamido-2-methylpropane sulfonate, polyethyleneimine, polyoxyethylene sorbitol hexaoleate, etc., to replace the acrylamide described in Examples 1-5 above. The above Examples can also be repeated to include other additives such as an epoxy resin, polysaccharide, cellulose, Ca$^+$ nano-clay etc., to replace methyl cellulose or Na$^+$ clay nano-composite described in Examples 2 and 4 above.

Example 7

Acceleration or Delay of Re-Assembling

This process can also be expanded to a range of gelation acceleration or delay, from 1.5 hours to 350 hours. This can be accomplished by varying the concentration or the composition of "re-assembling agents" or additives.

Materials and Polymerization for Examples 8 and 9

Acrylamide (purity above 98+%) and n-Decane (purity above 99%, a continuous phase) were purchased from Alfa Aesar (USA). Zirconium acetate (Zr(III, IV) 15%~17%) and Span 80 (viscosity among 1200~2000 mPa·s) were obtained from Sigma Aldrich (USA). Ammonium persulfate (purity above 98%) and acetone (ACS grade, water-soluble initiator) were supplied by Fisher Scientific (USA). All reagents were used without any further purification. Deionized water (DI water) was used for the preparation of all aqueous solutions.

Example 8

Acrylamide/Zirconium(III, IV) Initiated by Ammonium Persulfate

Figure 7:
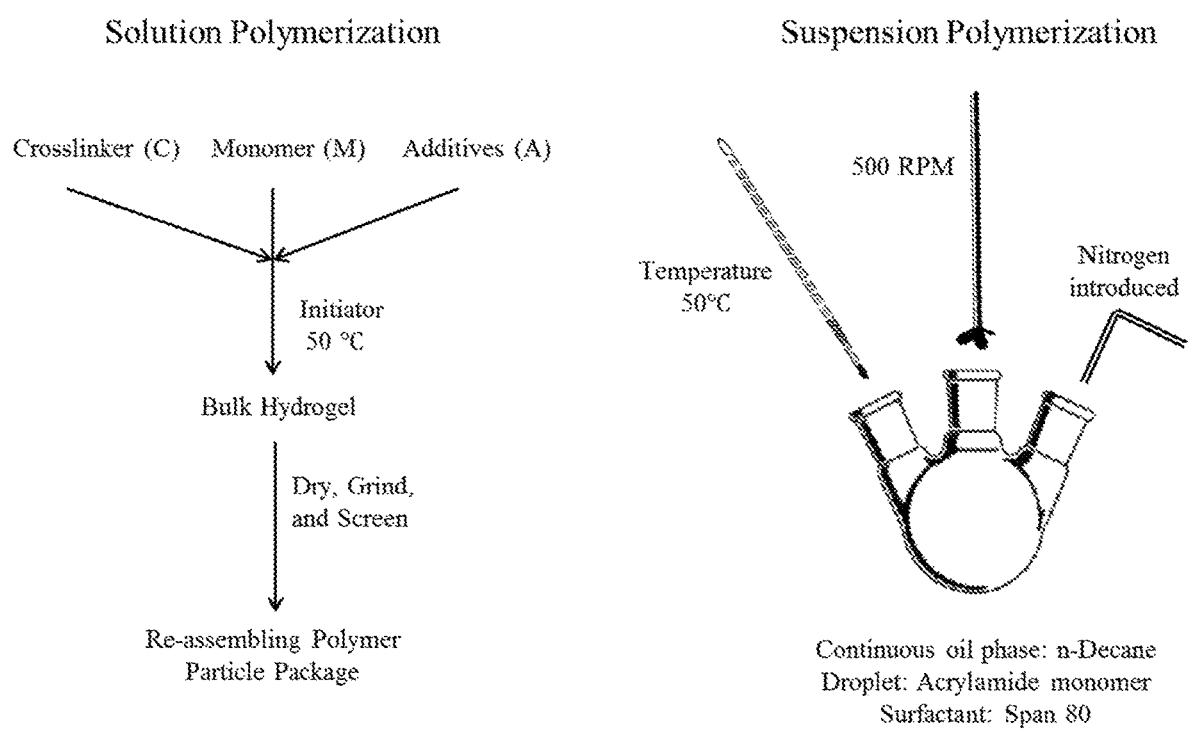
FIG. 7 is a schematic depicting the synthesis scheme of macroscopic re-assembling polymer particles ("RPP" or "RPPG" are used interchangeably herein; left, Example 8) and microspheric RPPG (right, Example 9)

Solution Polymerization, FIG. 7 Left

Acrylamide monomer was weighed and dissolved in a glass vessel and the appropriate volume of metal ions was added if an ion-mixed polyacrylamide system was used. The initiator (ammonium persulfate) was weighed in another glass vessel. DI water was added to both vessels, which were agitated until the reactants had dissolved completely. Different concentrations of reactants were obtained by diluting to the end concentration. One example of solution polymerization was given: 30 g acrylamide, 0.5 g~5 g zirconium acetate solution, and 100 g DI water were put into a glass vessel, which was agitated until the reactants had dissolved completely and uniformly. The solution was deoxygenized by nitrogen purging. The vessel was then put into a 50° C. oven for polymerization for 6 hours after adding 200 ppm ammonium persulfate as an initiator. The MPPG particles were obtained by drying synthesized bulk gels (50° C. for 48 hours) and grinding them, which was followed by a screening stage. MPPG with 1 g, 2 g, and 5 g zirconium acetate were named A1, A2 and A3, respectively. Dried product weights were 35.23 g, 35.48 g, and 36.5 g, respectively.

Example 9

Acrylamide/Zirconium(III, IV) Synthesized

Suspension Polymerization, FIG. 7 Right

Suspension polymerization of re-assembled micospheres (referred to as "IPM" herein) was carried out in a three-neck flask. The flask was equipped with a mechanical stirrer, a reflux condenser, a thermometer, and a nitrogen inlet, and was dropped into a constant temperature water bath. In suspension polymerization, n-Decane was used as a continuous phase, and Span 80 was added as a nonionic polymeric surfactant. A synthesis route for ions mixed (non-ions mixed) microsphere is shown below: (1) First, 20 g acrylamide and 0.45 g zirconium acetate were dissolved in 20 mL of distilled water. (2) Air was excluded from the acrylamide solution by introducing nitrogen for at least 15 minutes. (3) Acrylamide solution was then immediately poured into the 50 mL of n-Decane containing 2 g Span 80 after mixing with 0.026 g ammonium persulfate. (4) Air was flushed from the reactor by introducing nitrogen until the entire process was completed. (5) Polymerization was allowed to proceed for 3 hours at 50° C. with stirring rate of 500 RPM. (6) Then stirring was stopped, and the precipitate was washed with a large amount of acetone. The product was dried in a vacuum oven at 35° C. for 24 hours, and the obtained powder was a re-assembling polymer particle microsphere.

Example 10

Testing of Examples 8 and 9 Samples

Figure 8:
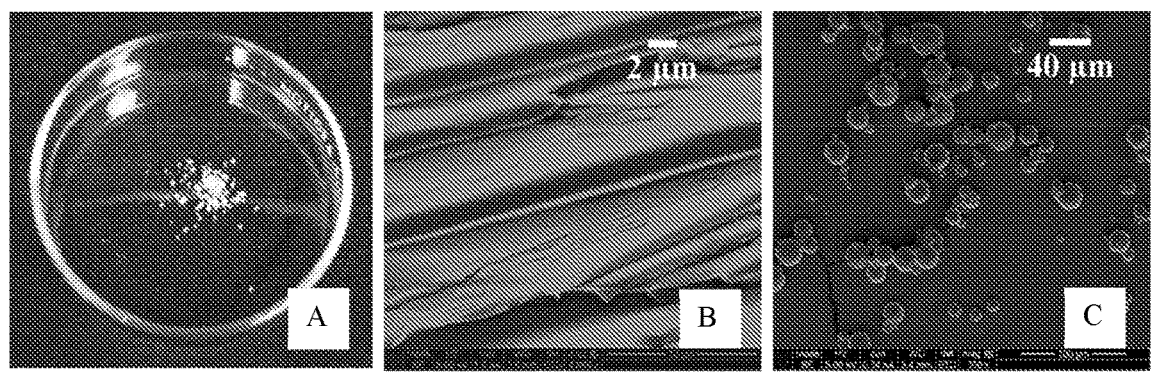
FIG. 8 is a morph demonstration (A), an SEM photograph (B) at 350× magnification of macroscopic RPPG, and a microspheric RPPG (C) synthesized by suspension polymerization (cleaned by acetone—Example 9)

After being cut into a small size, an as-prepared MPPG sample can be obtained (FIG. 8A). The surface morphology of the MPPG was studied by SEM and is shown in FIG. 8B. Dry MPPG particles were composed of uniform, sheet-like structures that are actually compressed network structures. The IPM microsphere morphology was studied as well (FIG. 8C). Furthermore, the size distribution of the dry IPM microsphere was shown to be over a wide range, which resulted from the suspension polymerization method. By controlling the initiator concentration, stirring rate, surfactant contents, etc., the dry particle size was controlled. In this study, 9.8 μm average diameter IPM microspheres were used to observe the swelling behaviors.

Figure 9:
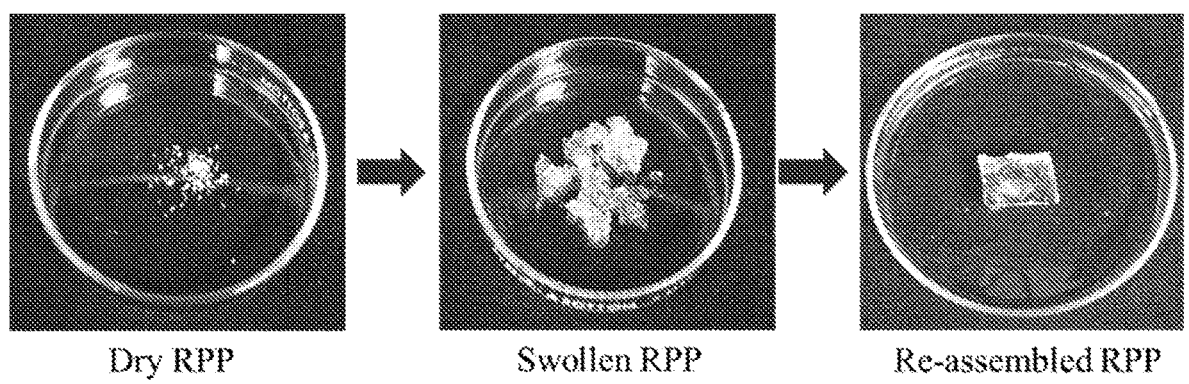
FIG. 9 is a set of photographs showing the re-assembling process of macroscopic RPPGs.
Figure 10:
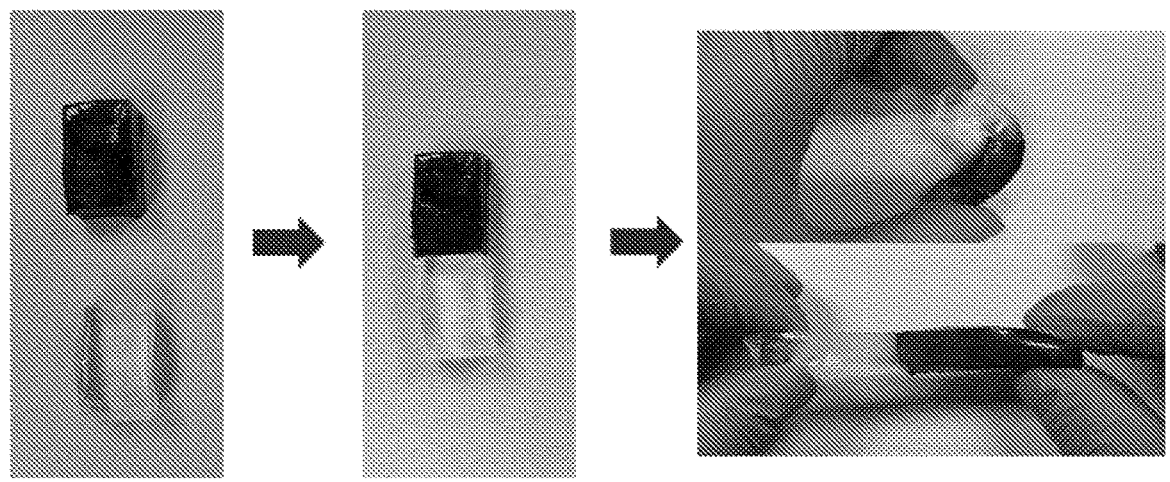
FIG. 10 is a set of photographs showing the re-assembling phenomenon between swelled hydrogels.

For macroscopic RPPGs, the re-assembling phenomenon happens after being placed into a feeding solvent and waiting for a predetermined time. The particles started to swell after being contacted with the solvent. At a desired period, the contacted particles started to generate links with each other and finally became one (FIG. 9). For better observation of this process, two big, bulky RPPGs (pre-treated with a feeding solvent) were contacted and put into a 50° C. oven for 6 hours. They re-assembled with each other on the contact face. This re-assembling force was sufficiently strong to avoid them separating again (FIG. 10). The feeding solvent can be any common solvent: deionic water, sodium chloride solution, or other metallic ions solutions.

Figure 11:
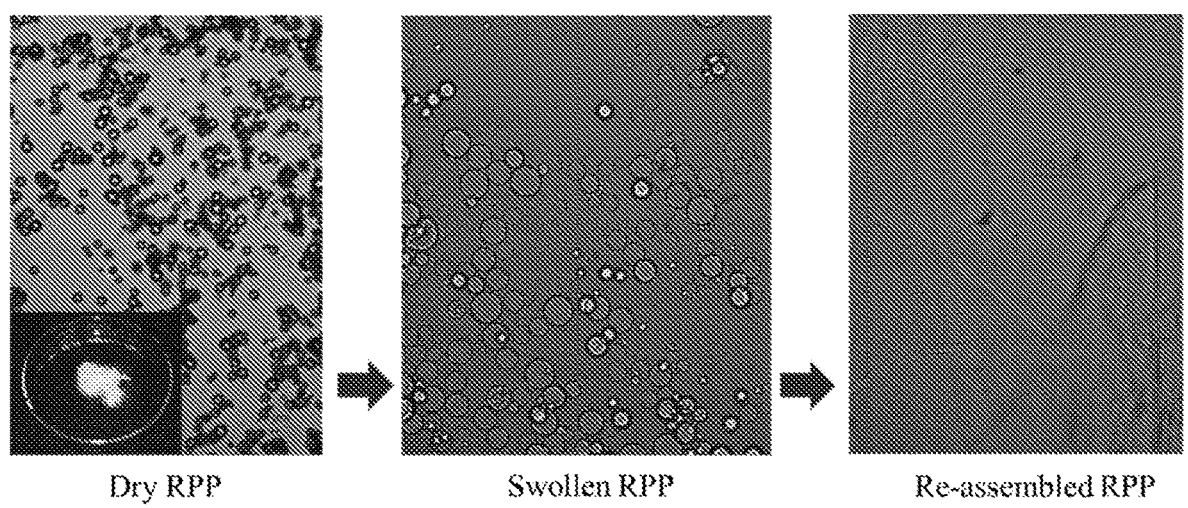
FIG. 11 is a set of photographs (40× magnificant) showing the re-assembling process of microsphere RPPG.

Similarly, microspheric RPPGs synthesized by suspension polymerization show the same property as macroscopic RPPGs. They can be stored as dry particles or mixed in solvents (FIG. 11, left). Size distribution of the dry microspheres was around 9.8 μm based on the polymerization method in Example 8. After being placed into deionized water and heated in an 80° C. oven for 15 days, these particles were fully swollen (FIG. 11, middle) and re-assembled to a millimeter-level gel (FIG. 11, right).

Figure 12:
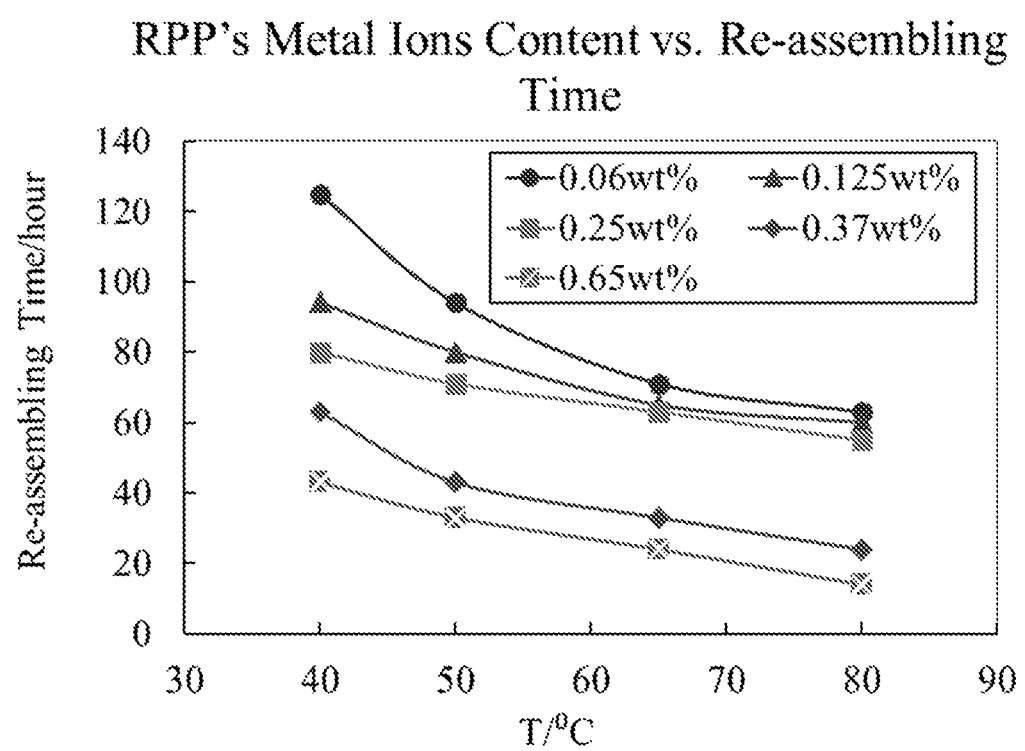
FIG. 12 a graph depicting the re-assembling times at various temperatures of RPPGs having varying metal ion contents.

By controlling the assembling agent (zirconium acetate), RPPG re-assembling time could be controlled (FIG. 12). Generally, increasing the assembling agent concentration resulted in reduced re-assembling time. It was determined that 0.06% (same concentration with 0.5 g zirconium acetate) exhibited the longest re-assembling time, compared with others.

Figure 13:
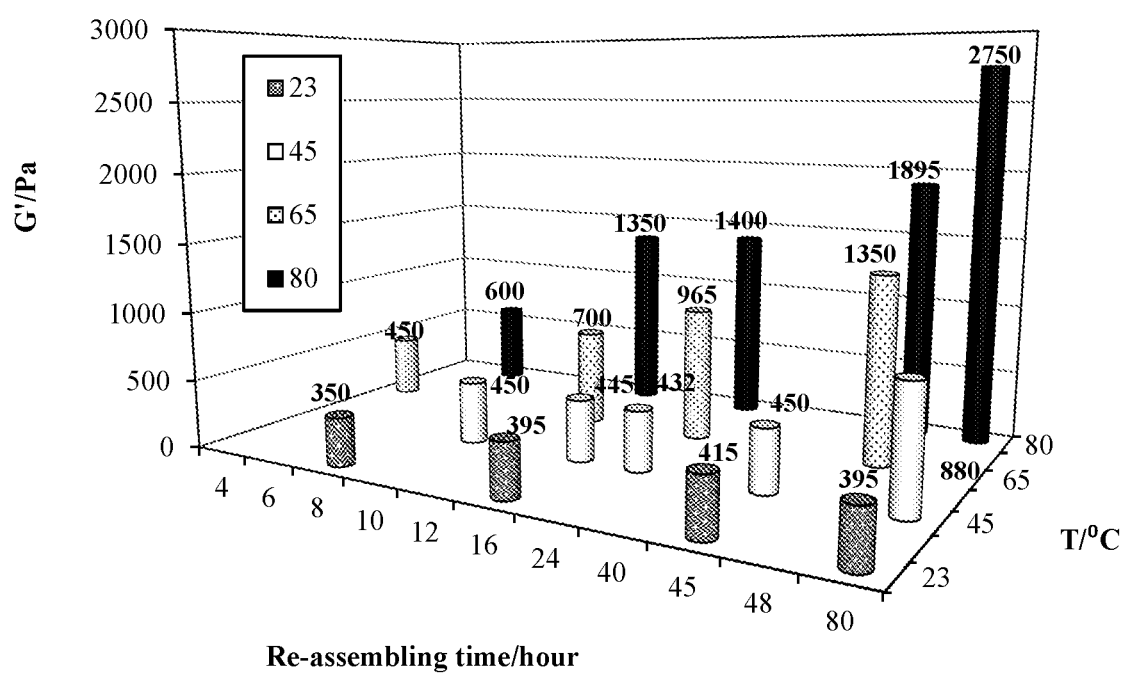
FIG. 13 is a graph illustrating the relationship between re-assembling time and elastic modulus (G') of macroscopic RPPG at various temperatures.

The elastic modulus could be controlled for different re-assembling time requirements under various temperatures based on the formulation of Example 8 without adding other additives. FIG. 13 shows the peaks of elastic modulus that can be handled for each temperature-to-times. Elastic modulus is one kind of rheological measurement for rubber-like gel product.

Figure 14:
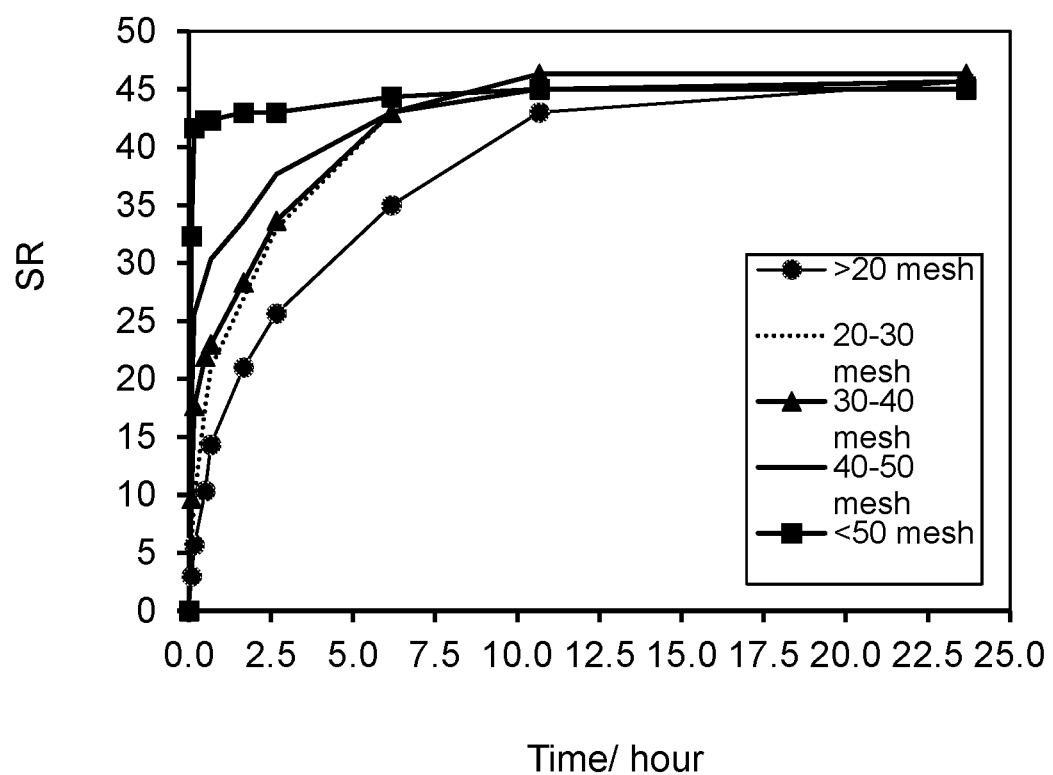
FIG. 14 is a graph showing the swelling behavior of macroscopic sample A3 (Example 8) with various screening sizes in 1% NaCl solution.

Dried Sample A3 with a size range from >20 mesh (relying on Sigma Aldrich particle size conversion table, ≈0.841 mm) to <50 mesh (≈0.297 mm) was selected for studying the swelling kinetic in saline solutions (FIG. 14). In this swelling kinetic experiment, pre-weighed samples were added to polyethylene test tubes (with scales) to which a measured concentration of saline solution (1% sodium chloride solution) was added. Typically an amount of brine at least one hundred times the weight of the PPG gel (gel's density was determined) were added to each tube to provide sufficient solvent for the gel to swell to its equilibrium conformation. The test tubes were sealed and placed in an ambient environment for several hours (until the swelling ratio didn't change any more), with daily recording that was long enough to allow the gel to swell to its equilibrium state. The swelling behavior of MPPGs was then determined as the gels height change in tubes, which represented the gel volume change during swelling. The swelling ratio was calculated from the following equation $$Q=(V_s-V_d)/V_d$$

where $V_d$ is the dry volume of the hydrogel, and $V_s$ is the volume of the hydrogel in liquid.

Figure 15A:
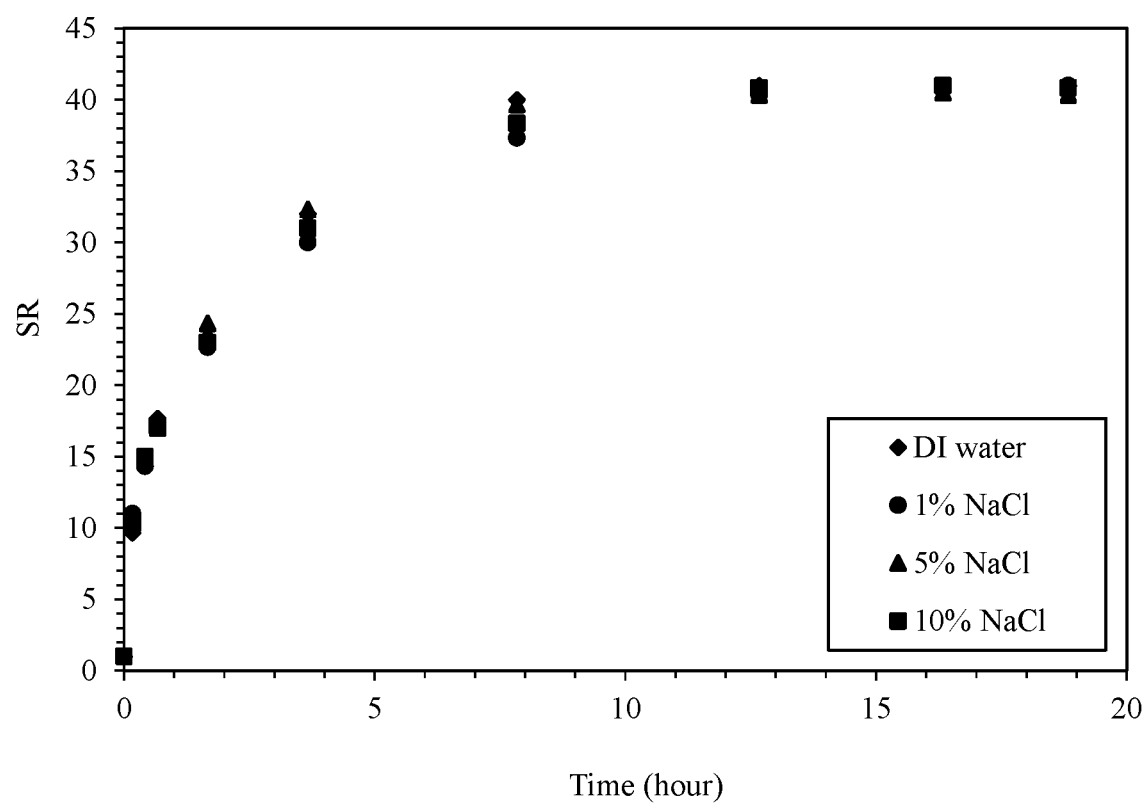
FIG. 15 is a set of graphs showing the swelling ratio as a function of different salt solution concentrations (FIG. 15a) or types (FIG. 15b) at 23° C.
Figure 15B:
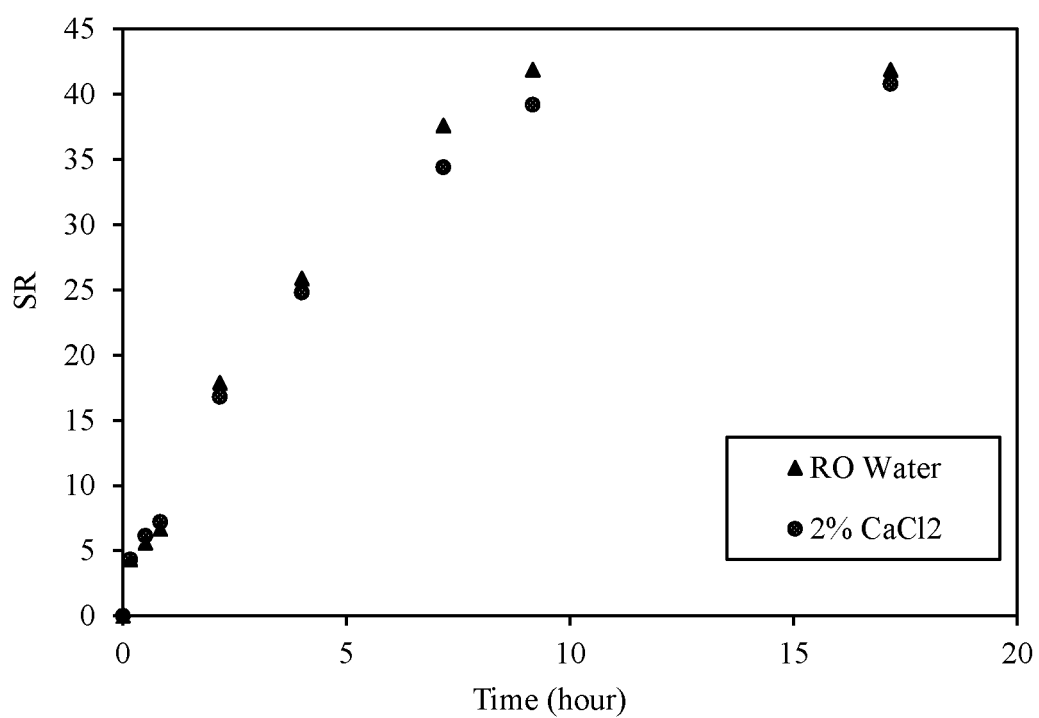

The synthesized macroscopic RPPG package was insensitive to saline solutions. FIG. 15 shows several A3 sample swelling curves that were obtained in different concentrations and types of saline solutions, respectively. These curves demonstrated that macroscopic RPPG package's swelling ratio will not be affected by brine efficiently.

Figure 16:
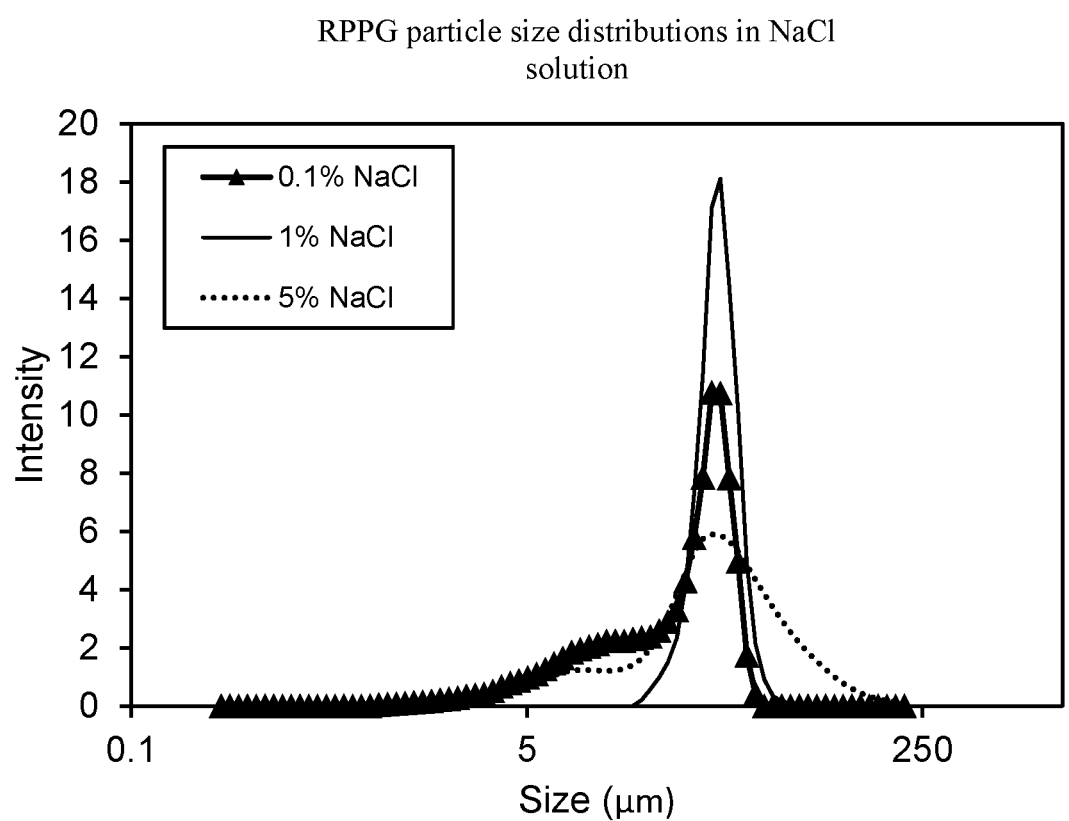
FIG. 16 is a graph depicting the effects of three different NaCl solutions on the fully swelled particle size distribution of microspheric RPPG at 23° C.

Similarly, fully swollen microsphere RPPG particle size distributions as a function of NaCl solution concentrations are shown in FIG. 16. It can be observed that with increasing NaCl concentration of solutions, no size distribution peak left shift phenomenon appeared.

Figure 17:
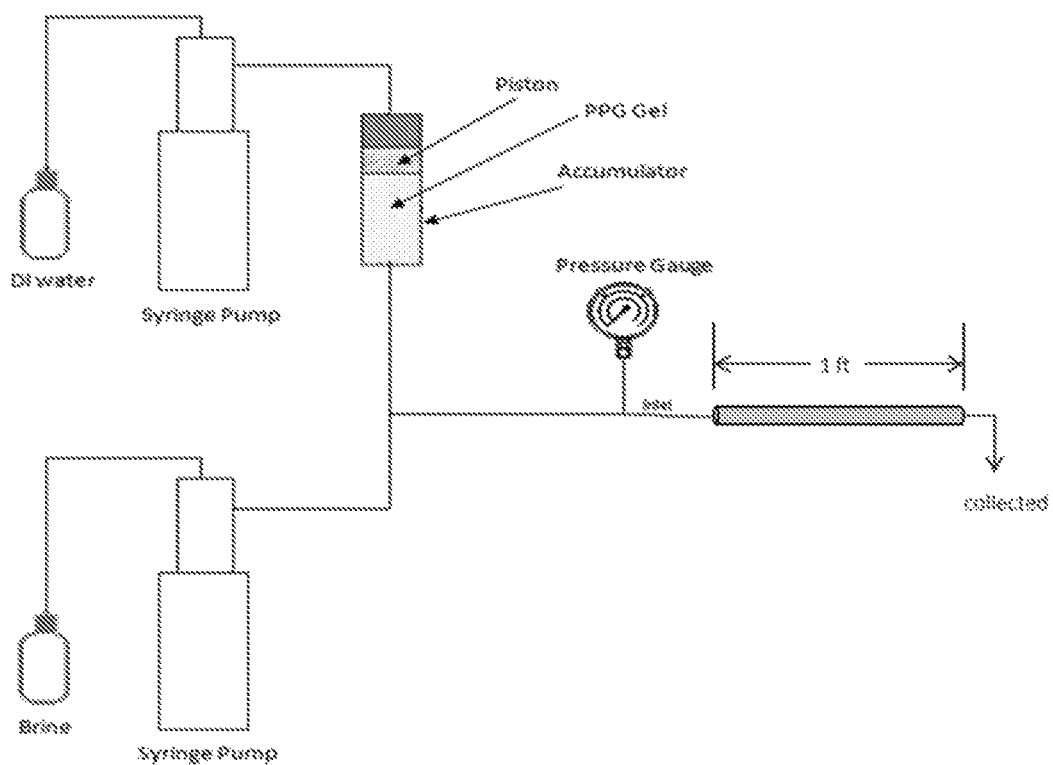
FIG. 17 is a schematic illustration of the conduit flooding model.

As FIG. 17 shows, two syringe pumps were carried out in the study, one for pumping swelled gel, another for pumping brines. After the RPPGs were injected from the gel accumulator to the conduit, they packed into the conduit. After gel placement, the conduit was unloaded and put into 80° C. oven for the re-assembling stage. A comparison experiment was done without heating to see the difference in the RPPGs before and after re-assembling. The heated conduit was reloaded into the system, and brine injection commenced with constant pressure into the tubing to test the breakthrough pressure of the RPPGs. To obtain the pressure threshold before dropping, the system pressure was controlled constantly with small pressure increases with each attempt (1~3 psi/attempt). After the moment of breakthrough, the pump was immediately switched to constant flow rate model with 0.1 mL/min.

Figure 18:
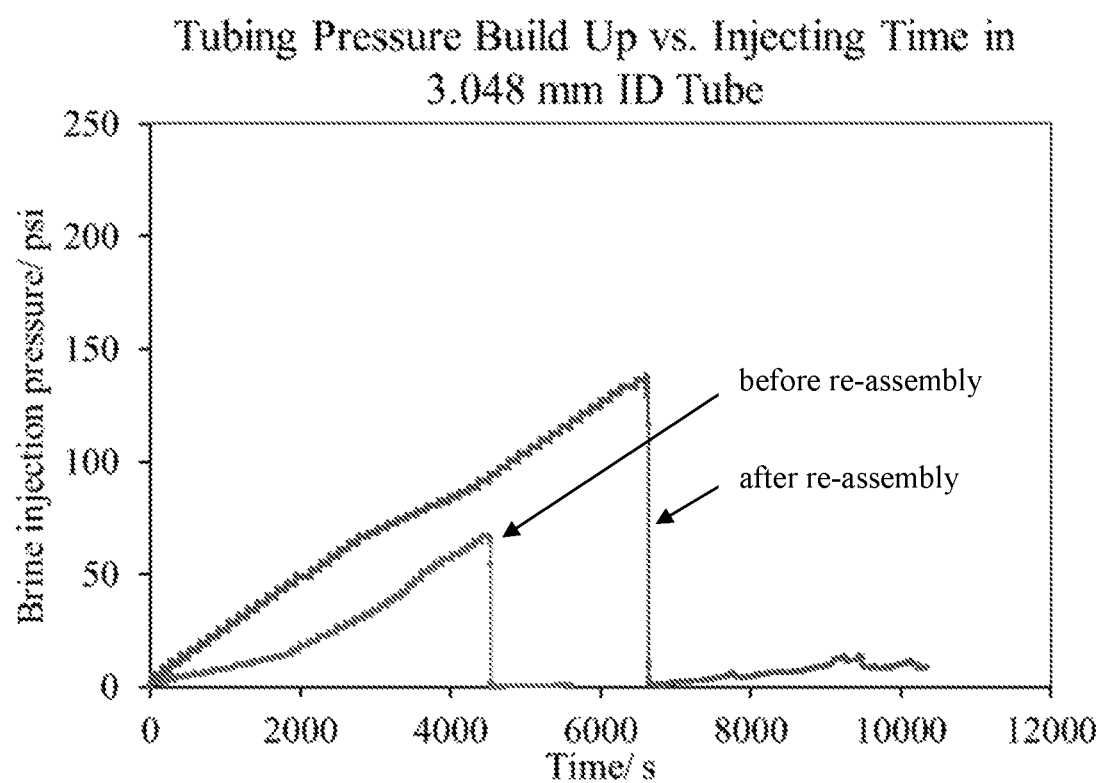
FIG. 18 is a graph showing the "building up" curves of 3.048 mm ID tubing pressure (A3 sample, 20 mesh)
Figure 19:
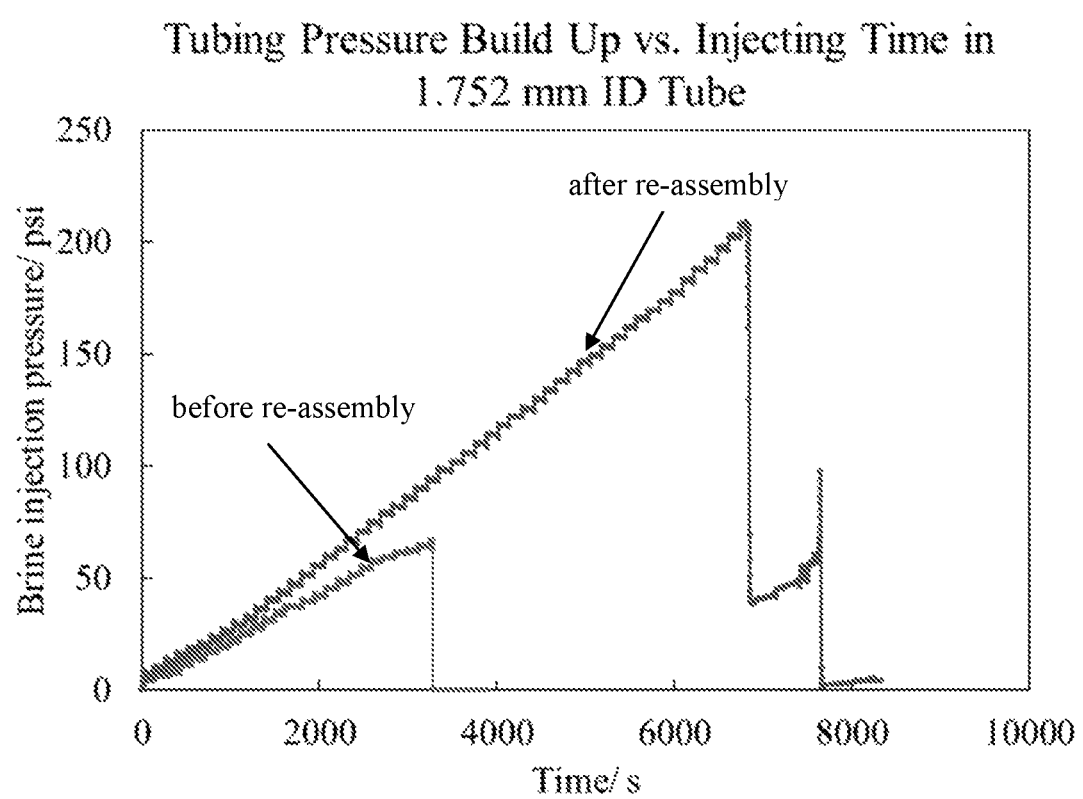
FIG. 19 is a graph showing the "building up" curve of 1.752 mm ID tubing pressure (A3 sample, 20 mesh)

This experiment visually proved the plugging ability of the RPPGs. After re-assembling in simulated holes, the RPPGs formed an integral bulk gel that dramatically increased breakthrough pressure. For the same sample (A3, 20 mesh), after injecting into different size conduits, the smaller conduit showed higher pressure built up. RPPG breakthrough pressure in 3.048 mm conduit increased from 62 psi to 144 psi (FIG. 18), while in 1.752 mm conduit the increase was from 64 psi to 213 psi (FIG. 19).

Example 11

Acrylamide/Zirconium(II, IV) Initiated by Ammonium Persulfate

Figure 20:
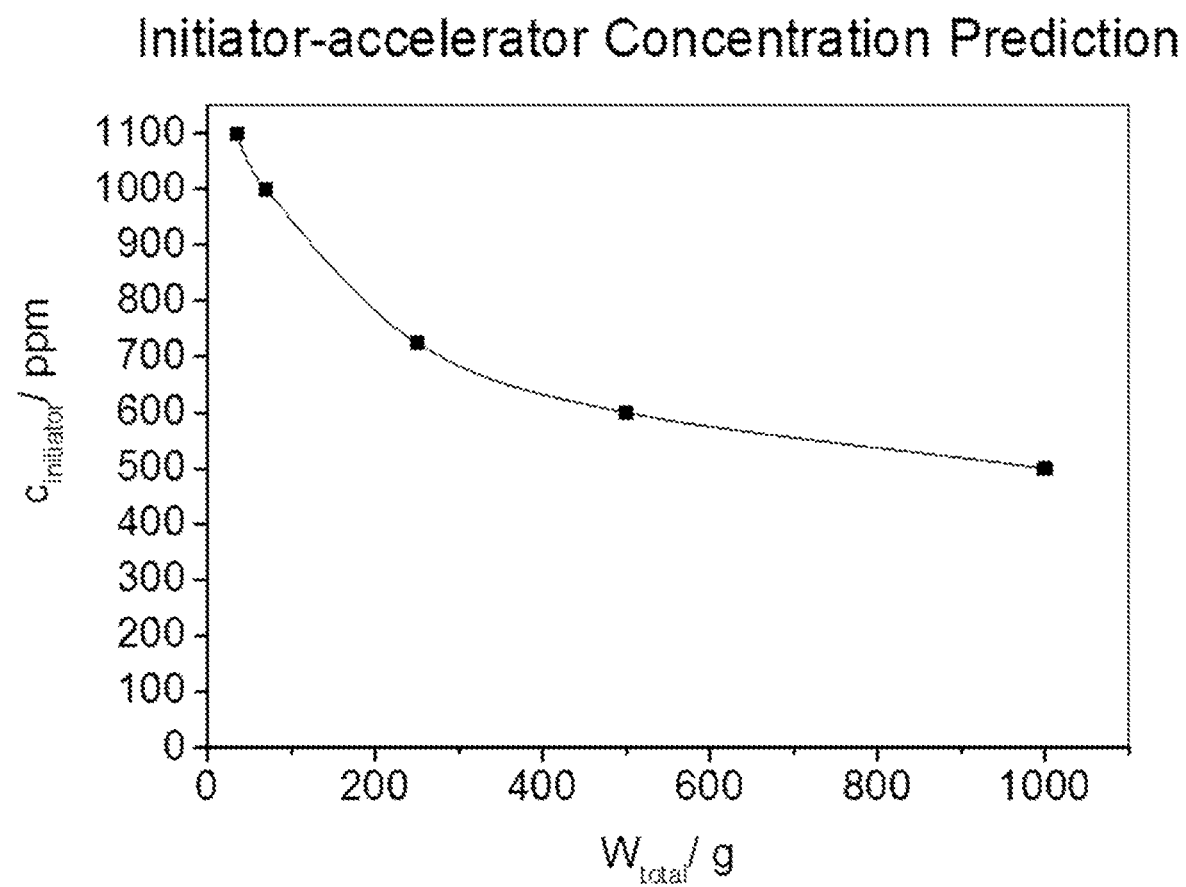
FIG. 20 is a graph showing the relationship between minimum initiator and accelerator concentrations for RPPG gelation with reactant solution scales.

A representative zirconium(III, IV)-acetate sealed in polyacrylamide package, herein referred to as "Z2-R1 to Z2-R5" was prepared containing 6,500 ppm Zr(III, IV) using a solution polymerization process. In this process, an aqueous mixture containing 30 g acrylamide, 100 g deionized water, and 5.7 g zirconium(III, IV) acetate hydroxide was prepared in a vessel to form a monomer mixture. The mixture was agitated until the reactants had dissolved completely. A pre-weighed initiator (APS) and an accelerator (STS) was dissolved separately in two different glass vessels (the APS amount was always equal to the STS amount, as shown in FIG. 20). The solution was deoxygenized by nitrogen purging.

The polymerization was prepared by mixing the monomer mixture and STS solution, following by rapid homogenization with stirring before adding the APS solution. Polymerization was carried out at room temperature (22.5° C.) for 10 hours, after which the product was dried and grinded.

Example 12

Acrylamide/Chromium(III)/Zirconium(III, IV) Initiated by Ammonium Persulfate

In this Example, zirconium(III, IV)-acetate was mixed with chromium(III)-acetate as a re-assembling agent following the synthesis of Example 1.

Representative Cr(III) and Zr(III, IV) sealed in a polyacrylamide package, herein referred to as "P90" was prepared using a solution polymerization process. In such a process, an aqueous mixture containing 30 g acrylamide, 100 g DIW, 0.45 g chromium(III) acetate and 3.2 g zirconium(III, IV) acetate was agitated until the reactants had dissolved completely. An initiator (0.004 g ammonium sulfate) was weighed and dissolved in a separate glass vessel. The solution was deoxygenized by nitrogen purging.

The polymerization was carried out by mixing the aqueous solution and the initiator, followed by rapid homogenization with stirring. Polymerization was carried out in 50° C. for 6 hours, after which the product was dried and grinded.

Example 13

Acrylamide/Zirconium(III, IV)/N,N'-Methylenebisacrylamide Initiated by Ammonium Persulfate In this example, we mixed zirconium(III, IV)-acetate with N,N'-Methylenebisacrylamide ("MBAA") as the re-assembling agent following the synthesis of Example 1.

A representative Zr(III, IV) and MBAA sealed in a polyacrylamide package, herein referred to as "Z5-8" was prepared using a solution polymerization process. In this process, an aqueous mixture containing 30 g acrylamide, 100 g DIW, 5.7 g zirconium(III, IV)-acetate, and 0.0008 g MBAA was prepared was agitated until the reactants had dissolved completely. Ammonium persulfate (initiator, 0.004 g) was weighed and dissolved in a separate glass vessel. The solution was deoxygenized by nitrogen purging.

The polymerization was prepared by mixing the aqueous solution and the initiator, followed by rapid homogenization with stirring. Polymerization was carried out in 50° C. for 6 hours, after which the product was dried and grinded.

Example 14

Core Flooding Testing

Figure 21:
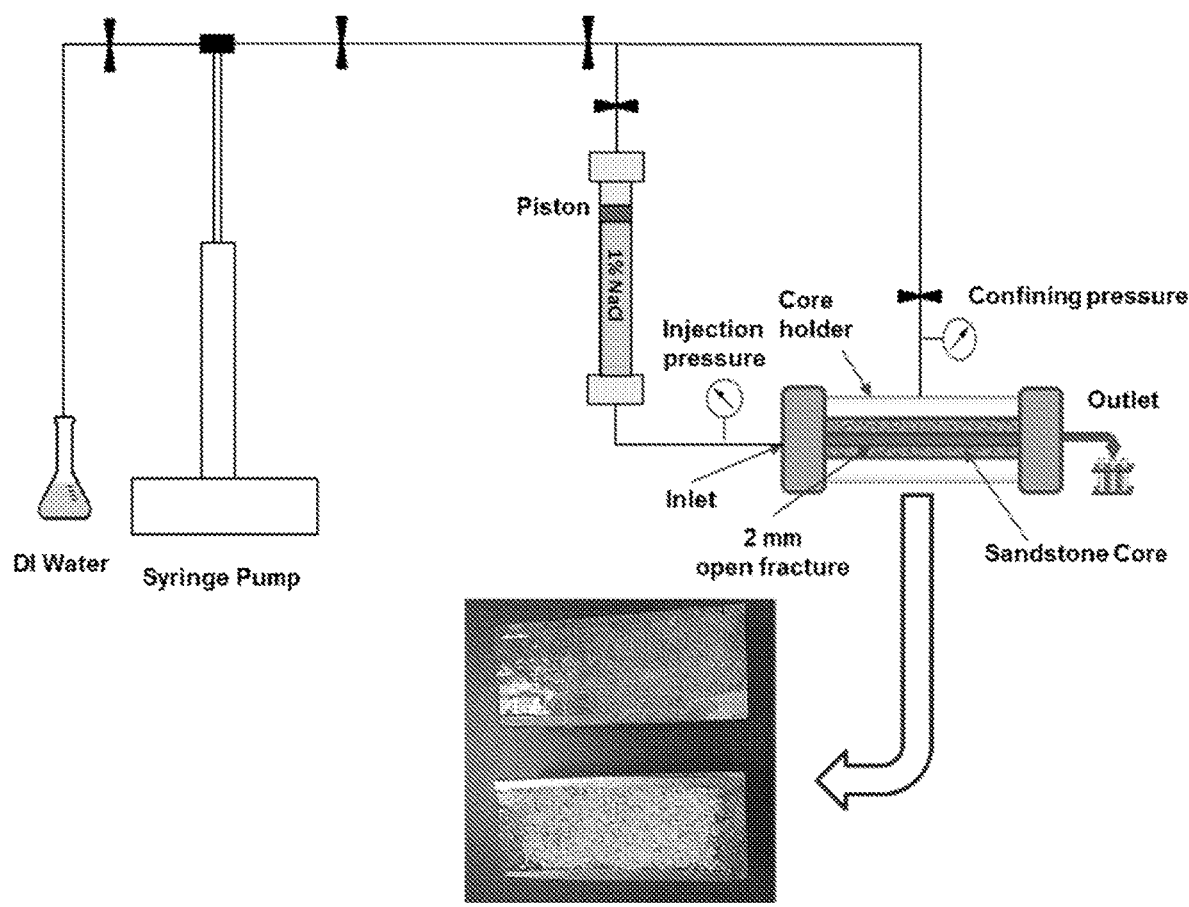
FIG. 21 is a schematic illustration of the core flooding apparatus of the open-fracture model used in the Examples.

Core flooding test was carried out to evaluate gel plugging efficiency during water injection. The apparatus utilized is shown in FIG. 21. The brine (1% NaCl) injection pressure results both before and after the gel was broken through were critical for gel strength studying. In this experiment, an artificial fracture was made on a 12 cm cylindrical core whose surface was sealed by a resin (fracture volume=12 cm*2 cm*5 cm). A certain number of RPPG Z5-8 dry particles were placed into the fracture. After brine injection for 2 hours, the core holder was unloaded and put into a 65° C. oven for gel re-assembling for 48 hours. The heated core holder was reloaded into the system and brine injection was commenced with a constant pressure into the tubing to test the injection pressure before and after the brine broke through the gel. To obtain the pressure threshold before dropping, the system pressure was controlled constantly with a small pressure increase during each attempt (1~5 psi/attempt) until the injection pressure was sufficiently large to break through the gel. After the moment of breakthrough, the pump was immediately switched to a constant flow rate of 0.1 mL/min. To compare with RPPG, the foregoing procedure was repeated using LiquiBlock™ 40K (a small particle size superabsorbent, available from Emerging Technologies Inc., Greensboro, N.C.) in place of RPPG.

Figure 22:
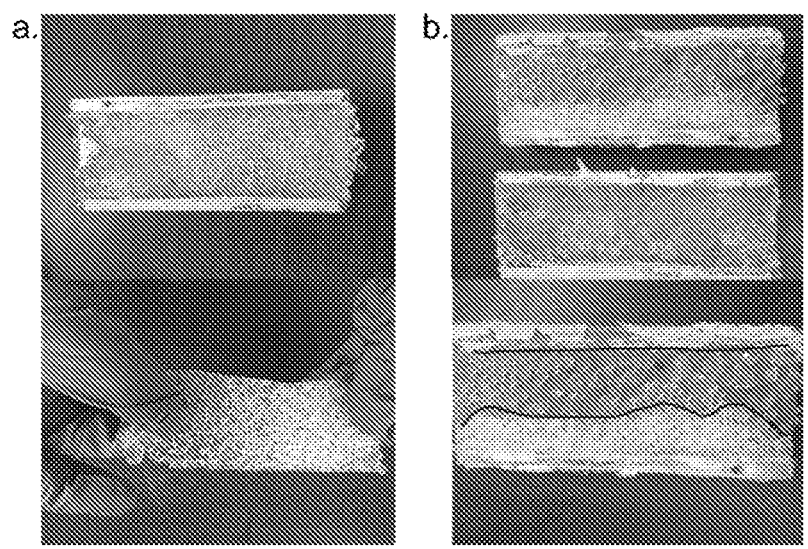
FIG. 22 is a set of photographs showing a disassembled core (a) plugged by RPPG and (b) plugged by 40K.
Figure 23:
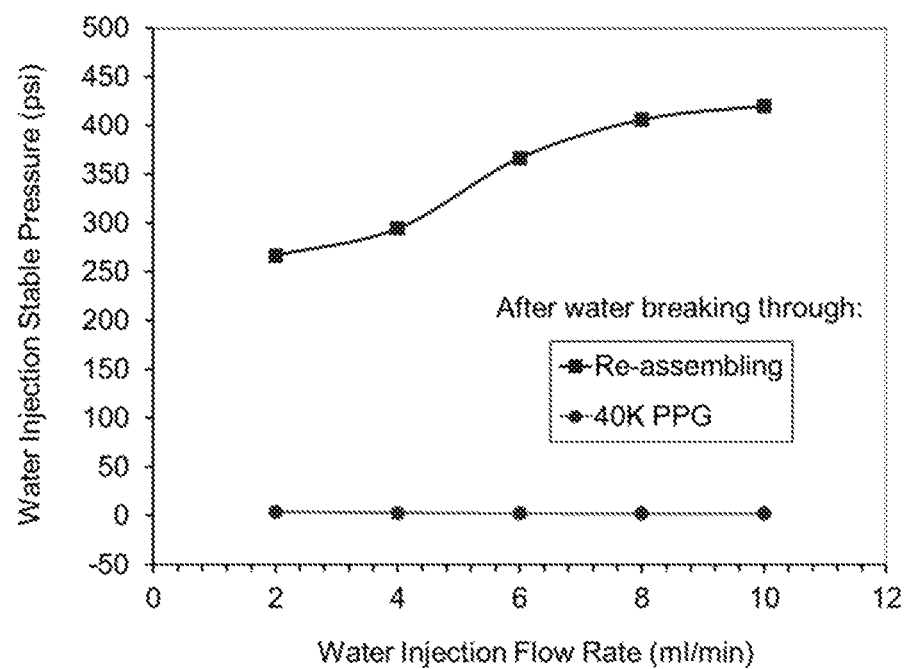

This experiment visually demonstrated the plugging ability of RPPG by comparing with LiquiBlock™ 40K commercial particles. After re-assembling in the fracture, the RPPG formed an integral bulk gel (as was shown in FIG. 22a), which dramatically increased brine injection pressure (254 psi/ft). Friction between the re-assembled bulk gel and the fracture inner surface holds the gel inside the fracture and also provides resistance to brine (FIG. 23). In the contrast experiment, the LiquiBlock™ 40K commercial particles also increased the brine injection pressure (247 psi/ft) before the brine broke through (FIG. 22b). However, after breakthrough, the LiquiBlock™ 40K commercial particles were constantly washed out from the fracture, and the injection pressure suddenly dropped to 0 psi/ft.

We claim:

1. A composition useful for controlling fluid flow, said composition comprising a plurality of swellable particles, said particles comprising an assembling agent interspersed among crosslinkable polymer chains, said assembling agent being:
   one that will associate with the polymer chains upon exposure to a fluid capable of swelling the polymer chains; and
   selected from the group consisting of polyacrylamide, one of the multivalent Group III-VII transition metal molecules, methylene bisacrylamide, polyethylene glycol, dimethacrylate, phenol-formaldehyde, diallylamine, triallylamine, divinyl sulfonate, diethylene glycol, polyethyleneimine, dichlorophenol, benzoyl peroxide, di-tert-butyl peroxide, dibutyl hydrogen phosphite, and mixtures thereof.

2. The composition of claim 1, wherein said assembling agent is selected from the group consisting of Cr, Zr, Co, Ti, and Al molecules or ions; anionic species such as those selected from the group consisting of acetates, alkyl carboxylates, chlorides, nitrates, fluorides, carbonates, hydroxyls; and combinations of the foregoing.

3. The composition of claim 1, wherein said crosslinkable polymer chain is selected from the group consisting of polymers or copolymers of hydrolyzed polyacrylamide, polyacrylamide, chloroprene rubber, nitrile rubber, hydrophilic resin sulfonate, acrylamide, lauryl methacrylate, stearyl methacrylate, silicates, N, N-dimethylacrylamide, and combinations of the foregoing.

4. The composition of claim 1, wherein the weight ratio of crosslinkable polymer chains to assembling agent is from about 2:1 to about 200:1.

5. The composition of claim 1, said particles further comprising an additive selected from the group consisting of tackifiers, plasticizers, crosslinking agents, polymers other than said crosslinkable polymer, aromatic compounds, polysaccharides, deoxidants, adjustors of gelant, nanoclays, initiators, stabilizers, accelerators, and mixtures thereof.

6. The composition of claim 1, wherein the average particle size of said swellable particles is from about 80 nm to about 10 mm.

7. The composition of claim 1, wherein said particles have an initial average particle size, and said particles are swellable to a size that is at least about 30 times that of the initial average particle size.

8. The composition of claim 1, wherein said particles have an initial average particle size, and said particles are swellable to a size that is from about 10 times to about 200 times, and preferably from about 30 times to about 100 times, that of the initial average particle size.

9. A method of forming a composition useful for controlling fluid flow, said method comprising:
   (a) polymerizing a plurality of monomers in the presence of a source of an assembling agent so as to form crosslinkable polymer chains;
   (b) drying and reducing the average particle size of the product resulting from (a) to yield a plurality of swellable particles comprising said assembling agent interspersed among said crosslinkable polymer chains, said assembling agent being:
      (i) one that will associate with the polymer chains upon exposure to a fluid; and
      (ii) selected from the group consisting of monomers, oligomers, polymers, copolymers, Group III-VII transition metal containing molecules, Group III-VII transition metal ions, methylene bisacrylamide, polyethylene glycol, dimethacrylate, phenol-formaldehyde, diallylamine, triallylamine, divinyl sulfonate, diethylene glycol, aldehydes, polyethyleneimine, dichlorophenol, benzoyl peroxide, di-tert-butyl peroxide, dibutyl hydrogen phosphite, and mixtures thereof.

10. The method of claim 9, wherein said assembling agent is selected from the group consisting of Cr, Zr, Co and Al molecules or ions, organic compounds such as those selected from the group consisting of polyethylene glycol, dimethacrylate, phenol-formaldehyde, diallylamine, triallylamine, divinyl sulfonate, diethylene glycol diallyl aldehydes, polyethyleneimine, and combinations of the foregoing.

11. The method of claim 9, wherein said crosslinkable polymer chain formed in (a) is selected from the group consisting of polymers or copolymers of hydrolyzed polyacrylamide, polyacrylamide, xanthan, guar, chloroprene rubber, nitrile rubber, hydrophilic resin sulfonate, acrylamide, lauryl methacrylate, stearyl methacrylate, silicates, and combinations of the foregoing.

12. The method of claim 9, wherein the weight ratio of crosslinkable polymer chains to assembling agent in the particles resulting from (b) is from about 2:1 to about 200:1.

13. The method of claim 9, said particles resulting from (b) further comprising an additive selected from the group consisting of tackifiers, plasticizers, crosslinking agents, polymers other than said crosslinkable polymer, aromatic compounds, polysaccharides, deoxidants, adjustors of gelant, nanoclay, initiators, accelerators, stabilizers, and mixtures thereof.

14. The method of claim 9, wherein said source of assembling agent is selected from the group consisting of zirconium-acetate, chromium-acetate, aluminum acetate, aluminum citrate, cobalt acetate, zirconyl chloride, and mixtures of the foregoing.

15. The method of claim 9, wherein the average particle size of said particles resulting from (b) is from about 80 nm to about 10 mm.

16. The method of claim 9, wherein said particles resulting from (b) have an initial average particle size, and said particles are swellable to an average particle size that is at least about 40 times that of the initial average particle size.

17. The method of claim 9, wherein said particles resulting from (b) have an initial average particle size, and said particles are swellable to a size that is from about 20 times to about 200 times that of the initial average particle size.

* * * * *